US008130454B2

(12) United States Patent
Noguchi

(10) Patent No.: US 8,130,454 B2
(45) Date of Patent: Mar. 6, 2012

(54) ENDOSCOPE OBJECTIVE OPTICAL SYSTEM

(75) Inventor: Azusa Noguchi, Hino (JP)

(73) Assignee: Olympus Medical Systems Corp., Tokyo (JP)

( * ) Notice: Subject to any disclaimer, the term of this patent is extended or adjusted under 35 U.S.C. 154(b) by 111 days.

(21) Appl. No.: 12/508,817

(22) Filed: Jul. 24, 2009

(65) Prior Publication Data
US 2010/0020408 A1    Jan. 28, 2010

(30) Foreign Application Priority Data

Jul. 28, 2008 (JP) ................. 2008-193198

(51) Int. Cl.
*G02B 15/14* (2006.01)
*G02B 21/02* (2006.01)
(52) U.S. Cl. ........................ 359/690; 359/656
(58) Field of Classification Search ........... 359/690, 359/686–687, 676, 725
See application file for complete search history.

(56) References Cited

U.S. PATENT DOCUMENTS

| 5,175,650 | A | | 12/1992 | Takayama et al. | |
|---|---|---|---|---|---|
| 5,526,186 | A | * | 6/1996 | Sekine | 359/683 |
| 5,805,351 | A | * | 9/1998 | Hayashi | 359/686 |
| 6,252,723 | B1 | | 6/2001 | Nagaoka | |
| 6,353,504 | B1 | * | 3/2002 | Yamamoto | 359/686 |
| 6,850,373 | B2 | * | 2/2005 | Mihara et al. | 359/676 |
| 7,369,324 | B2 | * | 5/2008 | Shibayama | 359/686 |
| 7,764,437 | B2 | * | 7/2010 | Yamamoto | 359/676 |
| 2007/0206293 | A1 | | 9/2007 | Takato | |
| 2010/0073778 | A1 | * | 3/2010 | Hirakawa | 359/684 |

FOREIGN PATENT DOCUMENTS

JP    4-218012    8/1992
JP    11-316339   11/1999

OTHER PUBLICATIONS

Extended European Search Report dated Dec. 11, 2009.

* cited by examiner

*Primary Examiner* — Jordan Schwartz
(74) *Attorney, Agent, or Firm* — Scully, Scott, Murphy & Presser, P.C.

(57) ABSTRACT

An endoscope objective optical system used in an endoscope has an objective optical system including a first lens group having a positive refractive power, an aperture stop, a second lens group having a negative refractive power and a third lens group having a positive refractive power, the first lens group, the aperture stop and the second and third lens group being successively disposed from the object side. The second lens group is made movable along an optical axis to change the focal length of the objective optical system. The lens surface at the object-side outermost position in the first lens group is formed so as to be convex on the object side.

14 Claims, 19 Drawing Sheets

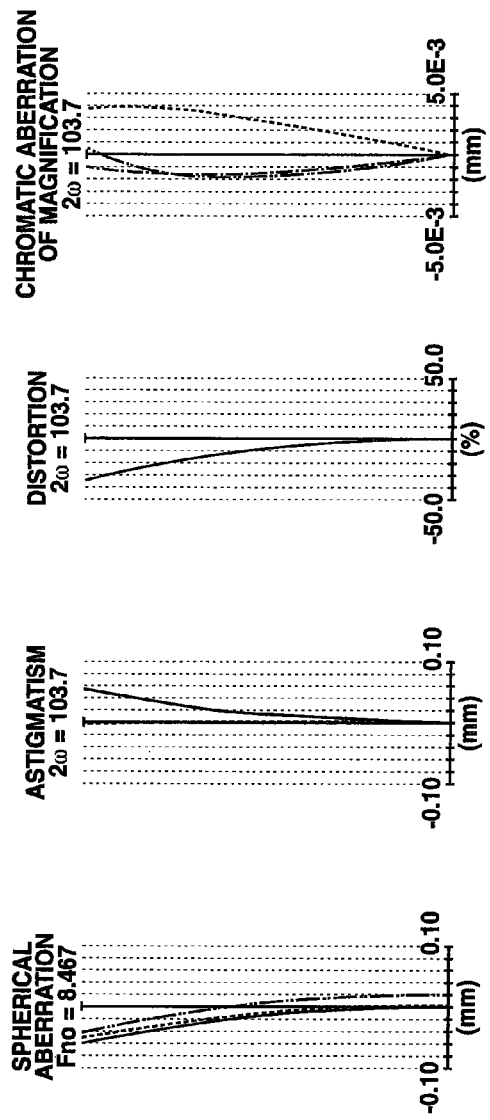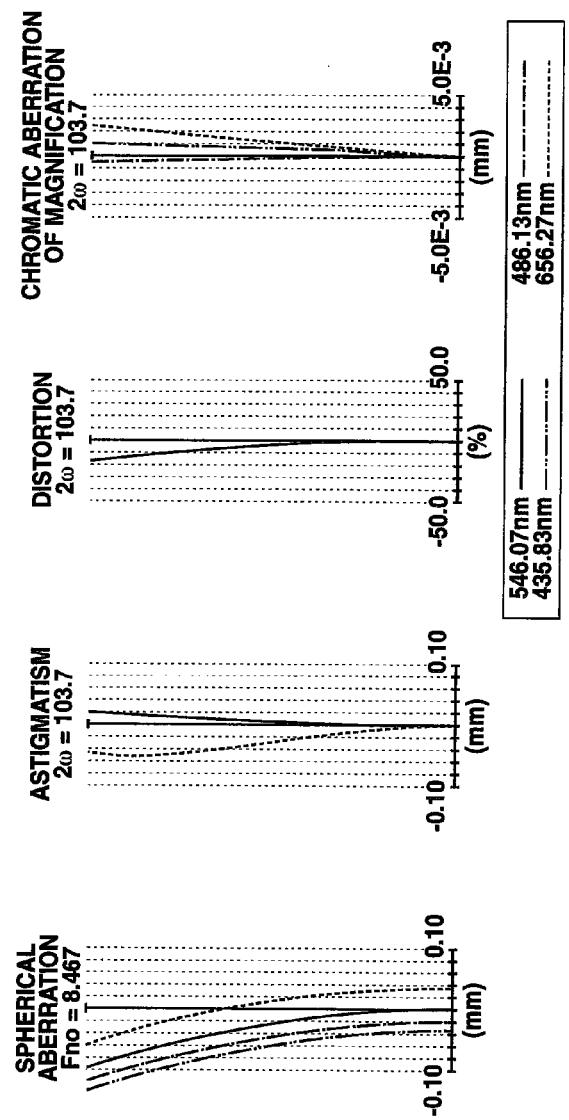

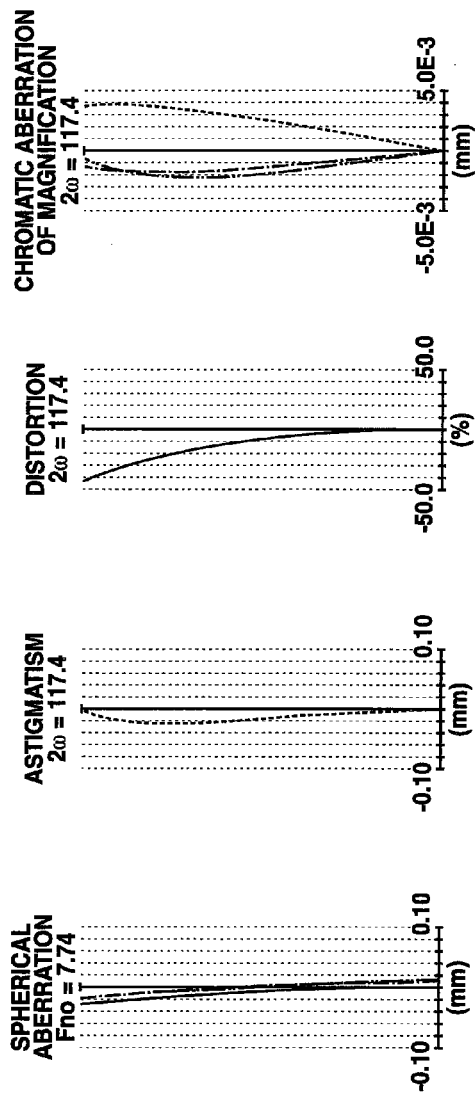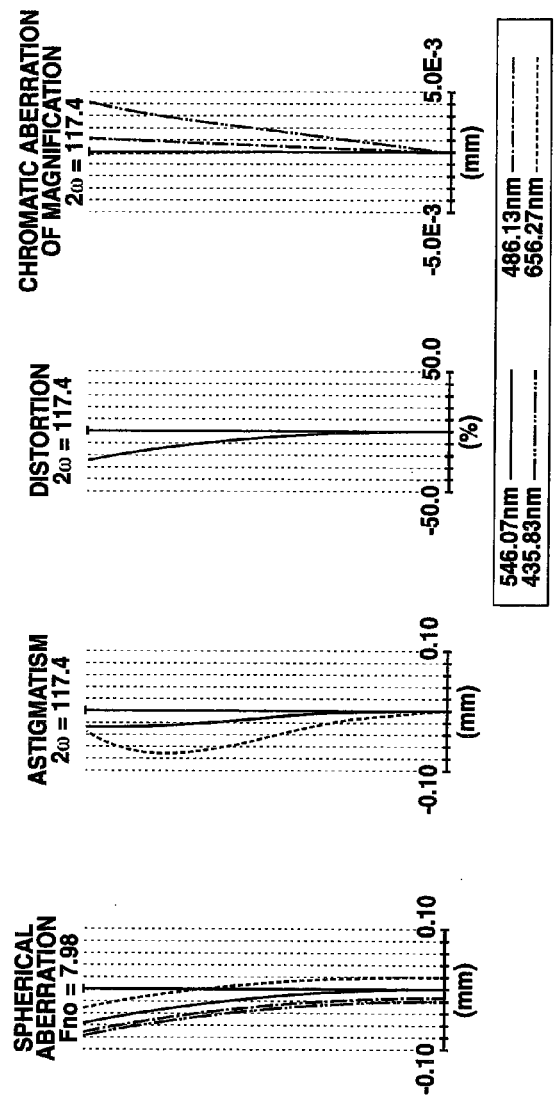

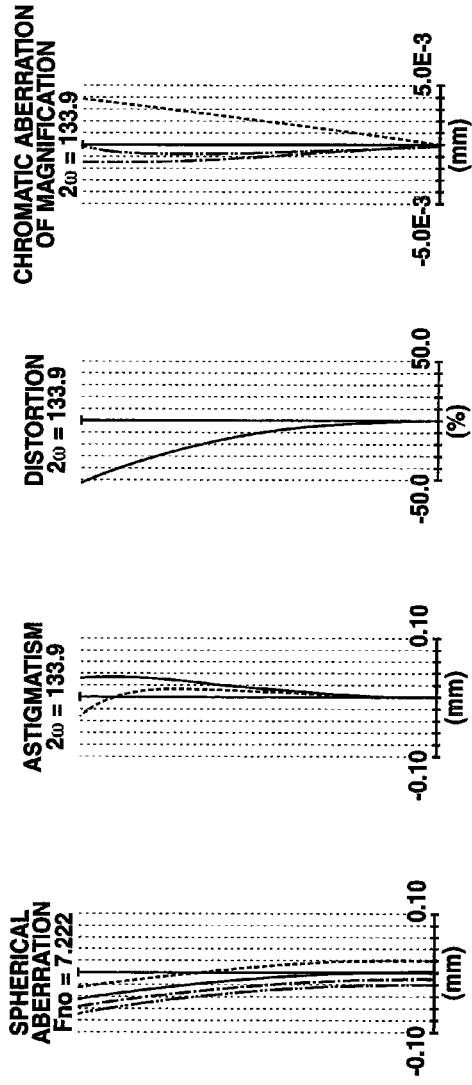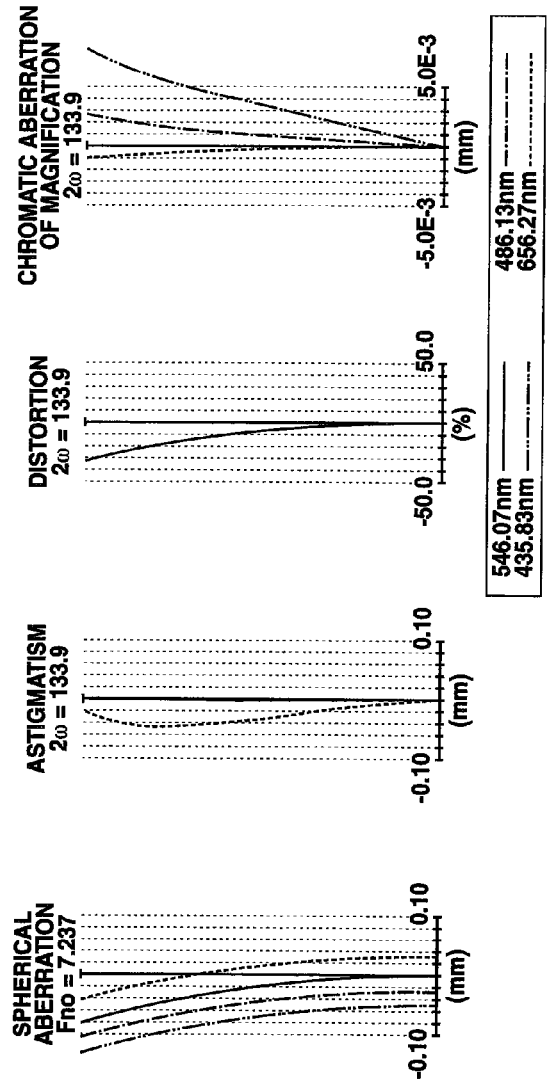

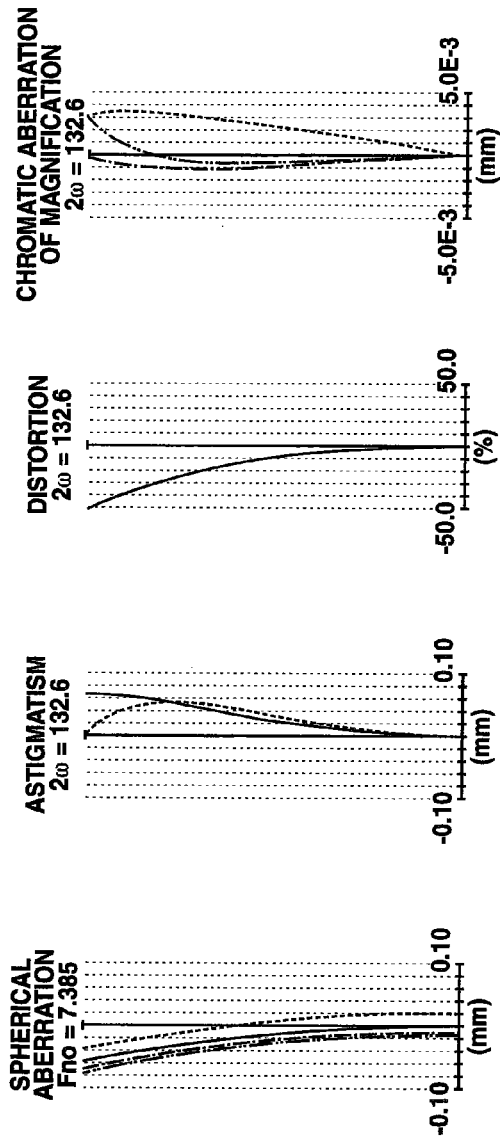
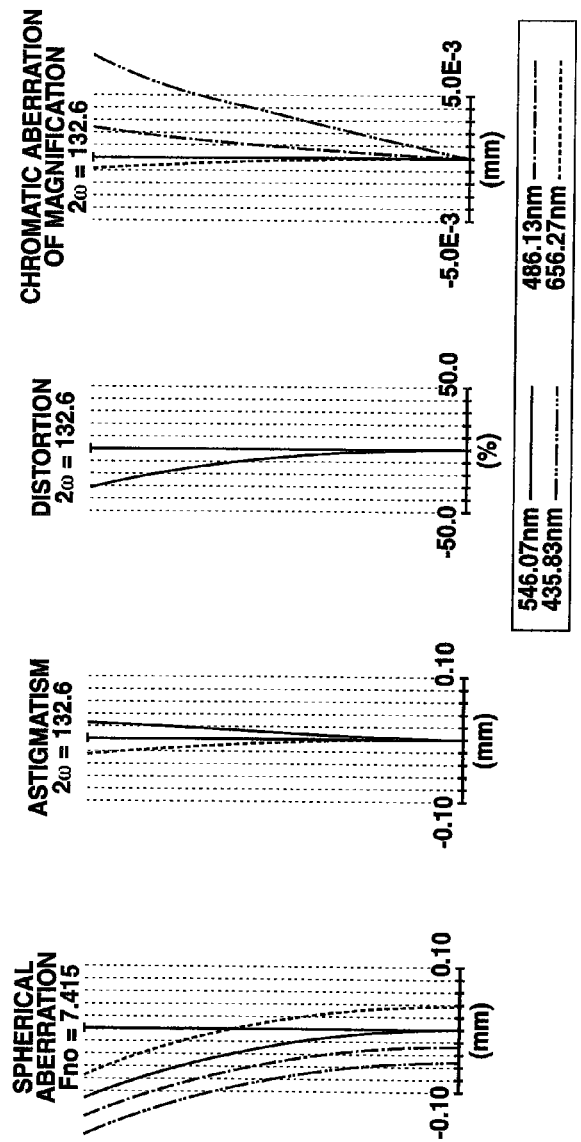
FIG.19A
FIG.19B

ENDOSCOPE OBJECTIVE OPTICAL SYSTEM

This application claims benefit of Japanese Application No. 2008-193198 field in Japan on Jul. 28, 2008 the contents of which are incorporated by this reference.

BACKGROUND OF THE INVENTION

1. Field of the Invention

The present invention relates to an endoscope objective optical system having a magnification change function and capable of magnifying observation.

2. Description of the Related Art

In recent years, there has been an increasing demand for an optical system capable of magnifying observation for accurate diagnosis of lesions. Japanese Patent Application Laid-Open Publication Nos. 4-218012 and 11-316339 disclose optical systems capable of magnifying observation, each of which is constituted by three groups of lenses: positive, negative and positive lens groups successively disposed from the object side, and in which the second negative lens group is moved to change the focal length, in other words, perform magnification change and focusing.

In endoscopes, a large depth of field and freedom from degradation in image quality from near point to a far point contribute to ease of observation and ease of finding a lesion. The depth of field is expressed by the following expression:

$$\Delta x \propto P \times F_{no.}/f^2$$

where $\Delta x$ is the depth of field; P is the pixel pitch of an image pickup device; $F_{no.}$ is the F-number of an objective optical system; and f is the focal length of the objective optical system. From this expression, it can be understood that the characteristics of the depth of field are as described below.

(a) The larger the pixel pitch of the image pickup device, the larger the depth of field.

(b) The larger the F-number of the objective optical system (the smaller the aperture), the larger the depth of field.

(c) The smaller the focal length of the objective optical system, the larger the depth of field.

Also, there is a demand for higher image quality of endoscopic images to improve the accuracy of diagnosis, and the adoption of new image pickup devices having larger numbers of pixels is being pursued.

The adoption of an image pickup device having a larger number of pixels entails a reduction in depth of field, because the image pickup device has a reduced pixel pitch. Also, prevention of degradation in image quality in the event of a diffraction phenomenon caused by an increase in F-number, i.e., a reduction in aperture of an aperture stop, requires determining the specifications of the optical system so that the F-number satisfies the following Rayleigh limit condition expression.

$$F_{no.} < 1.64 \times P/\lambda$$

where $F_{no.}$ is the F-number of the objective optical system; P is the pixel pitch of the image pickup device; and $\lambda$ is the wavelength.

From the above expression, it can be understood that the F number cannot be made sufficiently large if the pixel pitch P is reduced.

For the above-described reason, the depth of field of the objective optical system used for image pickup device is reduced due to reductions in pixel pitch and F number of image pickup devices with improvement in image quality of endoscopes.

SUMMARY OF THE INVENTION

An endoscope objective optical system used in an endoscope according to the present invention has an objective optical system including a first lens group having a positive refractive power, an aperture stop, a second lens group having a negative refractive power and a third lens group having a positive refractive power, the first lens group, the aperture stop and the second and third lens group being successively disposed from the object side. The second lens group is made movable along an optical axis to change the focal length of the objective optical system. The lens surface at the object-side outermost position in the first lens group is formed so as to be convex on the object side.

BRIEF DESCRIPTION OF THE DRAWINGS

FIGS. 3A and 3B are diagrams showing spherical aberrations, astigmatisms, distortions and chromatic aberrations of magnification in the set state at the wide-angle end and in the set state at the narrow-angle end at the time of magnifying observation, respectively, in Embodiment 1 of the present invention;

FIGS. 9A and 9B are diagrams showing spherical aberrations, astigmatisms, distortions and chromatic aberrations of magnification in the set state at the wide-angle end and in the set state at the narrow-angle end at the time of magnifying observation, respectively, in Embodiment 4 of the present invention;

FIGS. 17A and 17B are diagrams showing spherical aberrations, astigmatisms, distortions and chromatic aberrations of magnification in the set state at the wide-angle end and in the set state at the narrow-angle end at the time of magnifying observation, respectively, in Embodiment 8 of the present invention;

FIGS. 19A and 19B are diagrams showing spherical aberrations, astigmatisms, distortions and chromatic aberrations of magnification in the set state at the wide-angle end and in the set state at the narrow-angle end at the time of magnifying observation, respectively, in Embodiment 9 of the present invention.

DETAILED DESCRIPTION OF THE PREFERRED EMBODIMENTS

Figure 1:
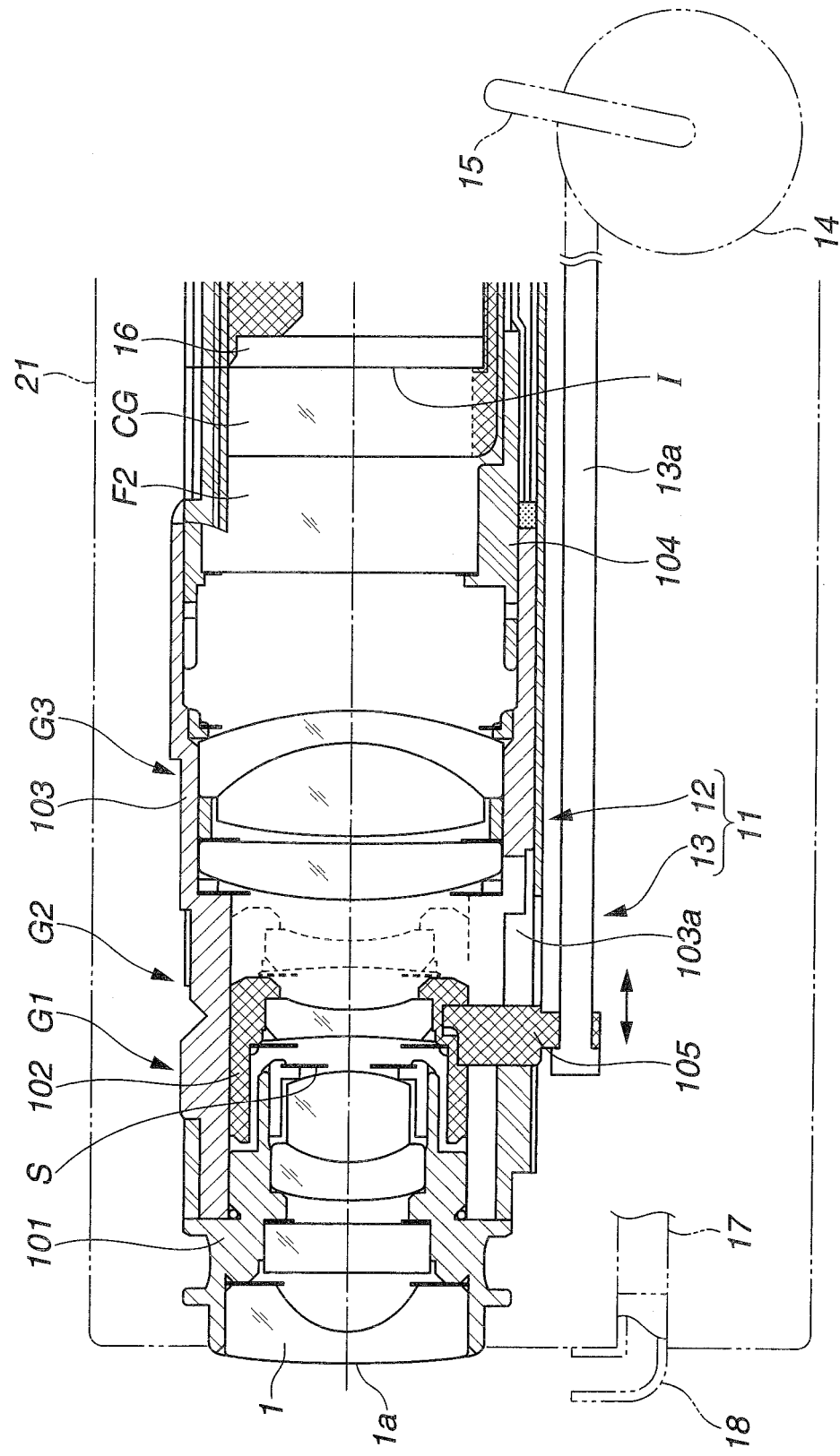
FIG. 1 is a diagram schematically showing an endoscope objective optical system in Embodiment 1 of the present invention together with a frame configuration.

The present invention will be described on the basis of embodiments thereof illustrated in the accompanying drawings. Essential features of the embodiments of the present invention will be described before description of the configuration of each embodiment.

In an endoscope, a first lens at an object-side outermost position in a first lens group of an endoscope objective optical system used in the endoscope is formed of a lens having negative refractive power to realize a wide field of view. In each of the endoscope objective optical systems of the embodiments (Embodiments 1 to 9) of the present invention, the lens surface on the object side of this lens having negative refractive power is formed into a convex surface to increase the positive refractive power of the first lens group. The positive power of the entire endoscope objective optical system is also increased thereby. The focal length can be made smaller (shorter) in this way when the field of view is fixed.

As described above, the depth of field is increased with reduction in focal length if the same image pickup device is used and if the F-number of the objective optical system is fixed. Therefore, by forming the lens surface at the object-side outermost position in the first lens group into a convex surface, the depth of field can be increased relative to that in the case where the corresponding lens surface is flat.

In an endoscope to which the present invention is applied and which is capable of magnifying observation, a second lens group is held by a movable frame so as to be movable in a predetermined range in the optical axis direction. The second lens group is set so as to be movable from the front end to the rear end in the movable range.

When the second lens group is set at the front end, the endoscope objective optical system is at a wide-angle end corresponding to the maximum of the field of view, i.e., in a set state for ordinary observation in which the optical system is used for ordinary observation. When the second lens group is set at the rear end, the endoscope objective optical system is in a set state at a narrow-angle end corresponding to the minimum of the field of view, in which the optical system is used for magnifying observation.

It is desirable that the field of view with respect to the maximum image height at the wide-angle end at the time of ordinary observation be sufficiently wide. When the field of view is 100° or more, an operator can easily perform ordinary operation smoothly. It is desirable that an operator can view as wide a region as possible at a time in an endoscope at the wide-angle end in the ordinary observation state to observe an internal body portion or to smoothly insert the endoscope. In all the embodiments of the present invention, therefore, the field of view is set to 100° or more.

Further, the configuration according to each of the embodiments of the present invention is such that the distance from the lens at the object-side outermost position to the image plane (or image pickup surface) is constant when the focal length is changed.

An endoscope is used in a body and cleaned and/or sterilized after being used for a diagnosis or a treatment. Therefore, an insertion portion to be inserted in a body has a watertight structure.

The endoscope objective optical system is fixed on a distal end member in the insertion portion. In a case where the endoscope objective optical system has such a configuration that its entire length can change, there is a need for structure for absorbing a change in length thereof. However, a cable for transmitting electrical signals is disposed from the image pickup device to an operation portion and to a connecting portion of a processor. When the entire length of the endoscope objective optical system is changed, it is necessary to move the entire cable, but it is difficult to do so from the technical viewpoint. Therefore the endoscope objective optical system of the present invention has such a structure that the entire length is not changed even when the second lens group is moved so that its focal length is changed.

Each embodiment of the present invention satisfies the following condition expression (1):

$$0.5 < |f_{o1}/f_w| < 1.2 \quad (1)$$

where $f_{o1}$ is the focal length of the first lens at the object-side outermost position in the first lens group, and $f_w$ is the focal length of the objective optical system at the wide-angle end.

By the condition expression (1), the power of the first lens at the object-side outermost position of the objective optical system in the first lens group is specified.

The objective optical system in the present invention requires a comparatively strong negative power on the object side to realize a wide field of view of 100° or more.

In the present invention, therefore, the first lens is formed of a lens having a negative power. However, if the negative power is excessively increased relative to the power of the entire optical system, a need arises to reduce the radius of curvature of the concave surface of the first lens on the image side and working on the lens becomes difficult.

Also, the influences of a manufacturing error in the radius of curvature of the concave surface and a manufacturing error in the depth of a spherical cut at the time of forming the concave surface on the field of view and the central angle of deviation become larger. If the variable term in the condition expression (1) is below the lower limit 0.5, the negative power of the first lens is excessively strong and it is difficult to produce the lens with stability.

If the power of the first lens is reduced, that is, the variable term exceeds the upper limit 1.2 in the condition expression (1), the ray height at the first lens is increased and the lens diameter of the first lens is increased, resulting in an increase in outside diameter size of the insertion portion of the endoscope. In each embodiment of the present invention, therefore, settings are made to satisfy the condition expression (1).

Each embodiment of the present invention also satisfies the following condition expression (2):

$$5 < r_{o1}/f_w < 20 \quad (2)$$

where $r_{o1}$ is the radius of curvature of the object-side surface of the first lens at the object-side outermost position in the first lens group. By the condition expression (2), the radius of curvature of the object-side lens surface of the first lens at the object-side outermost position in the first lens group is specified.

In some case of observation in a body through an endoscope, a foreign object is attached to the object-side lens surface of the first lens as a result of touching a mucous membrane or a residue in the body to impede observation. In such an event, water is jetted from a nozzle provided in the endoscope to the lens surface to remove the attached object.

In a case where the lens surface of the first lens on the object-side is a curved surface, if the variable term in the condition expression (2) is below the lower limit 5, the curvature of the lens is so strong (the projecting shape of the convex surface is so prominent) that water jetted from the nozzle cannot easily reach a portion of the lens surface on the opposite side (opposite from the nozzle).

If the variable term in the condition expression (2) exceeds the upper limit 20, the function of the first lens group to increase the positive power is lowered and the function to increase the depth of field is lowered.

In the configurations of Embodiments 2 to 9 of the endoscope objective optical system of the present invention, an aperture stop is attached together with the second group to the movable frame, and is moved together with the second lens group at the time of magnification change.

If the aperture stop is moved together with the second group, the ray height in the second lens group is reduced and, therefore, the lens diameter of the second lens group as a movable lens group can be reduced, which is advantageous in providing a mechanism for moving the second lens group.

Also, the second lens group can be made lighter in weight and the moving load can be reduced.

Also, if the aperture stop is moved integrally with the second group, variation in F-number between the set state at the wide-angle end and the set state at the narrow-angle end at the time of magnifying observation can be limited. Therefore, the F-number can be increased to a value selected by considering the diffraction limit in each set state, thus enabling increasing the depth of field.

In the configurations of Embodiments 6 to 9 of the endoscope objective optical system of the present invention, additionally at least one surface of the first lens group is formed into an aspherical surface. In Embodiment 9, at least one of the surfaces of the lens at the image-side outermost position or a cemented lens in the first lens group is formed into an aspherical surface.

In the case where the aperture stop is moved integrally with the second group, the ray height at the image side of the first lens group is lower in the set state at the wide-angle (when the optical system is set at the wide-angle end) end and is higher in the set state at the narrow-angle end during magnifying observation. At a position at which the ray height is higher, refraction of rays is increased. Therefore, a field curvature, an astigmatism and a comatic aberration occur at the time of magnifying observation.

Application of an aspherical surface to one of the surfaces of the lens at the image-side outermost position or a cemented lens in the first lens group enables making corrections so that the aberrations at the time of magnifying observation are reduced.

Also, at least one surface of the first lens at the object-side outermost position may be formed into an aspherical surface in Embodiments 6 to 8. The endoscope objective optical system capable of realizing magnifying observation according to the present invention has a wide field of view and realizes a wide-angle view by largely bending rays particularly at the first lens on the object-side outermost position.

Thus, the power of the first lens on the object-side outermost position is increased and the degree of refraction of rays at a peripheral position is thereby increased, so that an astigmatism and a comatic aberration can occur easily. Such aberrations can be corrected and reduced by forming an aspherical surface on the first lens on the object-side outermost position.

Each embodiment of the present invention also satisfies the following condition expression (3):

$$|\theta t/\theta w| < 3.5 \quad (3)$$

where $\theta t$ is the angle of incidence of a principal ray on the image plane when the optical system is at the narrow-angle end, and $\theta w$ is the angle of incidence of a principal ray on the image plane when the optical system is at the wide-angle end.

By the condition expression (3), a change in the angle of incidence on the image pickup surface of the image pickup device between the set state at the wide-angle end and the set state at the narrow-angle end is specified. The image pickup device has a square or rectangular image pickup surface (light receiving surface), and the field of view at which the image height is maximized corresponds to a diagonal direction in the image pickup surface.

When a principal ray along the diagonal direction is incident on the image pickup device outwardly from the center under the above-described condition, the ray height in the objective optical system is lower than that at the image pickup device. The optical system can therefore be reduced in size.

In the case of incidence of rays on the image pickup device at an angle, a loss occurs in the quantity of light on the image pickup surface. However, a loss in quantity of light at a particular angle of incidence can be prevented by devising the structure of a microlens or a color filter in a portion of the image pickup device on the image pickup surface.

However, if the angle of incidence is largely changed by magnification change, optimization on the image pickup device is difficult to perform. If the upper limit 3.5 in the condition expression (3) is exceeded, the amount of change in angle of incidence is so large that it is difficult to effectively perform optimization on the image pickup device and a reduction in quantity of peripheral light occurs at either the wide-angle end or the narrow-angle end.

Each embodiment of the present invention also satisfies the following condition expression (4):

$$1.5 < f_3/f_w < 3.5 \quad (4)$$

where $f_3$ is the focal length of a third lens group and $f_w$ is the focal length of the objective optical system at the wide-angle end. By the condition expression (4), the power of the third lens group is specified to specify the angle of incidence of rays on the image pickup device with respect to the maximum ray height in the set state at the wide-angle end.

In the set state at the wide-angle end, the distance between the second lens group and the third lens group in the optical axis direction is increased and travel of rays is such that rays shot outward by the negative power of the second lens group are refracted by the positive power of the third lens group so that the angle of incidence of the rays on the image plane is reduced.

If the variable term in the condition expression (4) is below the lower limit 1.5, that is, the focal length of the third lens group is shortened to increase the power, the power to refract principal rays through the third lens group is increased so that rays to be incident on the image pickup device travel along an outer position to a position closer to the optical axis or travel along a direction at a reduced angle from the optical axis in the case of traveling outward away from the optical axis.

Therefore, if the variable term in the condition expression (4) is below the lower limit 1.5, the ray height in the third lens group is increased and there is a need to increase the outside diameter of the lenses in the third lens group, resulting in an increase in outside diameter of the insertion portion of the endoscope.

On the other hand, if the variable term in the condition expression (4) exceeds the upper limit 3.5, that is, the focal length of the third lens group is increased to reduce the power, it is difficult to correct aberrations occurring in the first lens group.

The embodiments of the present invention will now be described.

Embodiment 1

An endoscope objective unit 11 in Embodiment 1 of the present invention shown in FIG. 1 has an objective optical system 12 mounted on a distal end portion of an insertion portion 21 of an endoscope by frames 101, 102, and 103. The objective optical system 12 has a first lens group G1, an aperture stop S, a second lens group G2, and a third lens group G3.

In the present embodiment 1, the frame 102 holding the second lens group G2 is formed as a movable frame to enable changing the focal length of the objective optical system 12 (i.e., performing magnification change) by moving the second lens group G2 along the optical axis direction. This movable frame is moved by a moving mechanism 13.

In the present embodiment 1, the first lens group G1 having a positive refractive power is constituted of, for example, four lenses and a filter; the second lens group G2 having a negative refractive power is constituted of a single lens having negative refractive power; and the third lens group G3 having a positive refractive power is constituted of, for example, three lenses.

The first lens group G1 is mounted in the frame 101, and a distal end of the frame 103 in which the third lens group G3 is mounted is fitted and mounted in the frame 101. The aperture stop S is mounted on a rear end of the frame 101.

In the present embodiment 1, the aperture stop S is fixed on the frame 101. In the other embodiments, the aperture stop S is moved with the second lens group G2 in the optical axis direction. A first lens 1 disposed at an object-side outermost position constituting the first lens group G1 is formed of a lens having negative refractive power. A lens surface 1a on the object side of this lens is formed into a convex surface rounded outward on the object side.

The frame 102 in which the lens having negative refractive power in the second lens group G2 is mounted is disposed on an inner peripheral surface of the frame 103 at the front end side of the same so as to be slidingly movable.

A projection 105 projecting from the frame 102 in a radial direction passes through a longitudinal slot 103a in the frame 103, and a distal end of a wire 13a constituting the moving mechanism 13 is fixed to an end portion of the projection 105. Wire 13a is passed through the insertion portion 21 along its longitudinal direction. A rear end of the wire 13a is fixed, for example, to a pulley 14 provided in an operation portion at the rear end side of the insertion portion 21.

An operator of the endoscope such as a surgeon can move the wire 13a by performing an operation of turning a knob 15 mounted on a shaft for the pulley 14 so that the frame 102 moves from a front end to a rear end in the range of movement of the frame 102. In a state where the frame 102 is set at the front end as indicated by the solid line in FIG. 1, the object optical system 12 is in a set state at a wide-angle end, in which the field of view is maximized, and in which the optical system is used at the time of (in the case of) ordinary operation.

By having the frame 102 moved to the rear end as indicated by a broken line in FIG. 1, the objective optical system 12 is set in a state at a narrow-angle end at the time of magnifying observation. Through the objective optical system 12 in this state, magnifying observation is performed.

A frame 104 holding a filter F2, a cover glass CG and an image pickup device 16 are mounted in a rear end portion of the frame 103. An image pickup surface I of the image pickup device 16 is an image plane on which an optical image of a subject (object) is formed.

In the process of assembling the endoscope objective unit 11, the distances between the frame 104 and the frames 101, 102, and 103 are adjusted after assembly of the frames 101, 102, and 103 to secure a correct focus. An operator can perform magnification change by moving the frame 102 in the optical axis direction.

It is, therefore, desirable that an outer peripheral portion of the frame 102 and an inner peripheral portion of the frame 103 to be brought into contact with each other be formed of members of a low friction coefficient. If these portions are formed of such members, an operation to move the frame 102 for magnification change can be smoothly performed.

It is also desirable that a portion of the frame 104 to be brought into contact with an inner peripheral portion of the frame 103 be formed of a member of a low friction coefficient.

When the frame 104 is moved relative to the frame 103 in an operation to adjust the focus position, the outer peripheral portion of the frame 104 and the inner peripheral portion of the frame 103 on the image plane I side are in contact with each other. The frames can therefore be smoothly moved relative to each other if their surfaces have low friction coefficients.

An example of a material of a low friction coefficient is a ceramic. A black pigment or dyestuff may be mixed in the ceramic material to make the ceramic material black, whereby the influence of reflection from the frame on an image is eliminated. A material prepared in this way is more preferable. Also, while the frame main body is formed of a metal, a portion that should have a low friction coefficient may be coated with a ceramic.

In a case where frames made of metals are moved, there is a possibility of surface portions of the frames being scraped off by rubbing between the metals to produce dust. Also, in a case where a surface treatment such as plating is performed on metals to reduce the reflectance in order to eliminate the above-described influence of reflection from the frames on images, a plating material is scraped off by contact between the members.

If dust having fallen is attached to the lens surface, it appears as a shadow in an image to degrade the image quality. Therefore, if the frames are formed of members such as ceramic members having a low friction coefficient and blackened, the occurrence of degradation in image quality due to generation of dust can be reduced.

As indicated by a double-dot-dash line in FIG. 1, a conduit 17 for air supply and water supply is provided in the insertion portion 21. A nozzle 18 bent so as to be generally L-shaped is attached to a distal end portion of the conduit 17. The direction in which water or the like is jetted out of the nozzle 18 is set so that the water is jetted to a central position on the object-side lens surface 1a of the first lens 1 of the objective optical system 12.

In a case where a body fluid or the like is attached to the lens surface 1a, the operator can jet water out of the nozzle 18 to wash away the attached material. In such a case, the radius of curvature of the object-side lens surface 1a of the first lens 1 is set so as to satisfy the condition expression (2).

Optical characteristics in the present embodiment 1 are set as shown by numeric value data below.

| (Object surface) | d0 = D0 | | |
|---|---|---|---|
| r1 = 15.136 | d1 = 0.4 | n1 = 1.88814 | v1 = 40.78 |
| r2 = 1.061 | d2 = 0.75 | | |
| r3 = ∞ | d3 = 0.62 | n2 = 1.51564 | v2 = 75 |
| r4 = ∞ | d4 = 0.24 | | |
| r5 = 4.141 | d5 = 0.48 | n3 = 1.81078 | v3 = 40.92 |
| r6 = 1.535 | d6 = 1.19 | n4 = 1.75844 | v4 = 52.32 |
| r7 = −2.107 | d7 = 0.03 | | |
| r8 = ∞ (Stop) | d8 = D1 | | |
| r9 = −8.226 | d9 = 0.34 | n5 = 1.48915 | v5 = 70.23 |
| r10 = 2.856 | d10 = 0.14 | | |
| r11 = ∞ | d11 = D2 | | |
| r12 = 5.741 | d12 = 0.75 | n6 = 1.59143 | v6 = 61.14 |
| r13 = ∞ | d13 = 0.08 | | |
| r14 = 7.985 | d14 = 1.23 | n7 = 1.73234 | v7 = 54.68 |
| r15 = −2.461 | d15 = 0.4 | n8 = 1.93429 | v8 = 18.9 |
| r16 = −5.373 | d16 = 1.84 | | |
| r17 = ∞ | d17 = 1.5 | n9 = 1.51825 | v9 = 64.14 |
| r18 = ∞ | d18 = 1.23 | n10 = 1.50801 | v10 = 60 |
| r19 = ∞ | | | |

| | Wide-angle end | Narrow-angle end (at the time of magnifying observation) |
|---|---|---|
| D0 = | 17 | 3.75 |
| D1 = | 0.4 | 1.37 |
| D2 = | 1.33 | 0.36 |
| Fno. = | 8.467 | 10.338 |

$f_w = 1.846$
$f_T = 2.086$
Field of view = 103.7
$|f_{01}/f_w| = 0.71$
$r_{01}/f_w = 8.20$
$|\theta t/\theta w| = 1.63$
$f_3/f_w = 2.09$ In the numeric value data shown above, r1, r2, . . . are the radii of curvature of the lens surfaces: the first lens surface 1a on the object side of the first lens 1 at the object-side outermost position and the other lens surfaces (including the stop) placed one after another from the first lens surface 1a on the image-plane side of the same; d1, d2, . . . are the thicknesses of and surface spacings between the first lens 1 at the object-side outermost position and the other lenses successively placed; and n1, n2, . . . are the refractive indices of the lenses with respect to e-line (wavelength: 546.07 nm).

v1, v2, . . . are Abbe constants of the lenses with respect to d-line (wavelength: 587.56 nm). D0 is the distance from the object plane to the first surface (r1) of the objective optical system 12; $f_T$, the focal length of the objective optical system 12 at the time of magnifying observation; fw, the focal length of the objective optical system 12 at the wide-angle end; f01, the focal length of the first lens 1 of the objective optical system 12; f3, the focal length of the third lens group G3; θt, the angle of incidence of a principal ray on the image plane in the magnifying observation state; and θw, the angle of incidence of a principal ray on the image plane at the wide-angle end.

The values of r and d representing lengths are shown in millimeters. These symbols are also used in common for the other embodiments.

Figure 2A:
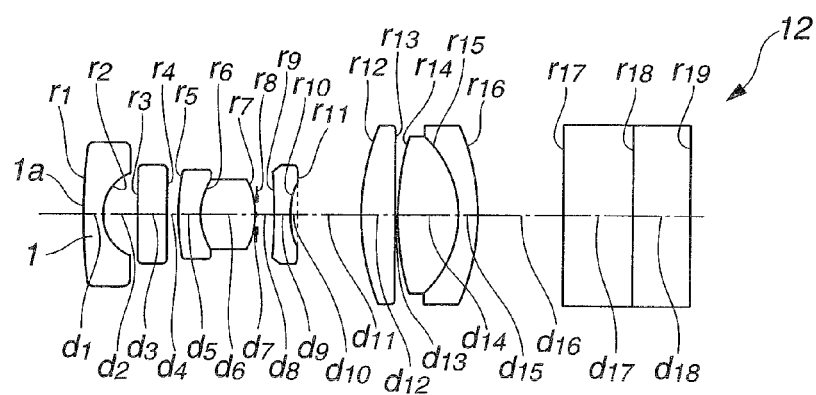
FIGS. 2A and 2B are diagrams showing the configuration of an optical system portion in a set state at a wide-angle end and in a set state at a narrow-angle end at the time of magnifying observation, respectively, in the endoscope objective optical system in Embodiment 1 of the present invention.
Figure 2B:
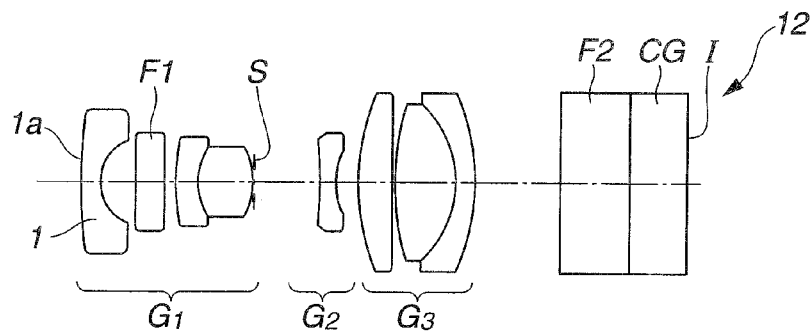

The optical system in Embodiment 1 is constituted of the lens groups successively disposed from the object side: the first lens group G1 (r1 to r7) having a positive refractive power; the second lens group G2 (r9, r10) having a negative refractive power; and the third lens group G3 (r12 to r16) having a positive refractive power, as shown in FIGS. 2A and 2B and by the numeric value data shown above. Magnification change is performed by moving the second lens group G2. The aperture stop S (r8) is disposed on the image side of the first lens group G1.

In the present embodiment 1, as shown in FIGS. 2A and 2B, the first lens group G1 is formed of a negative meniscus lens (r1, r2), a plane-parallel plate F1 (r3, r4) and a positive cemented lens (r5 to r7) formed by cementing a negative meniscus lens and a biconvex lens; the second lens group G2 is formed of a biconcave lens (r9, r10); and the third lens group G3 is formed of a flat-convex lens (r12, r13) and a positive cemented lens (r14 to r16) formed by cementing a biconvex lens a negative meniscus lens. On the image pickup surface I of the image pickup device 16, the cover glass CG for protecting the image pickup surface I and the plane-parallel plate F2 cemented to the cover glass CG are disposed.

Each of the plane-parallel plates F1 and F2 is a filter for cutting off light of a particular wavelength, e.g., 1060 nm light from a YAG laser, 810 nm light from a semiconductor laser or light in a near infrared region. These filers are also used in the other embodiments.

In the present embodiment 1, the lens surface 1a at the object-side outermost position in the first lens group G1 is formed of a convex surface, so that the focal length of the first lens group G1 can be reduced while the same field of view as that in the case where the corresponding lens surface is not convex is maintained, and the desired depth of field can be secured.

The field of view is larger than 100°, as shown in the numeric value data. The field of view corresponds to the maximum image height along the diagonal direction of the square or rectangular image pickup surface I.

When the setting of the second lens group G2 is changed by moving the second lens group G2 from the wide-angle end to the narrow-angle end for magnifying observation, the distance from the first lens 1 to the image plane I is not changed. In other words, the entire length of the objective optical system 12 is constant, not changed.

Effects attained by satisfying the condition expression (1) shown above are as follows: the workability of the first lens 1 at the object-side outermost position can be improved; a manufacturing error in the first lens 1 can be limited; and the outside diameter of the first lens 1 can be reduced.

An effect attained by satisfying the condition expression (2) shown above is as follows: the objective optical system can have the desired function of removing an attached material by jetting water from the nozzle 18 while maintaining a sufficient depth of field (which effect hereinafter expressed simply as "having a good water removal effect"). Therefore, the desired observation field can be easily secured by providing the objective optical system in the distal end portion of the insertion portion 21 of the endoscope.

FIGS. 3A and 3B show spherical aberrations, astigmatisms, distortions and chromatic aberrations of magnification in the set state at the wide-angle end and in the set state at the narrow-angle end, respectively, of the optical system in Embodiment 1. Lines used for measurement of aberrations are e-line (546.07 nm), F-line (486.13 nm), g-line (435.83 nm) and C-line (656.27 nm). 2ω represents the field of view.

As is apparent from FIGS. 3A and 3B, the aberrations are well corrected in either of the two states of the endoscope objective optical system 1 in Embodiment 1. Also, effects attained by satisfying the condition expressions (3) and (4) shown above are as follows: variation in quantity of peripheral light between the set state at the wide-angle end and the state at the narrow-angle end can be reduced and the lens diameter of the third lens group G3 can be reduced.

Embodiment 2

Figure 4A:
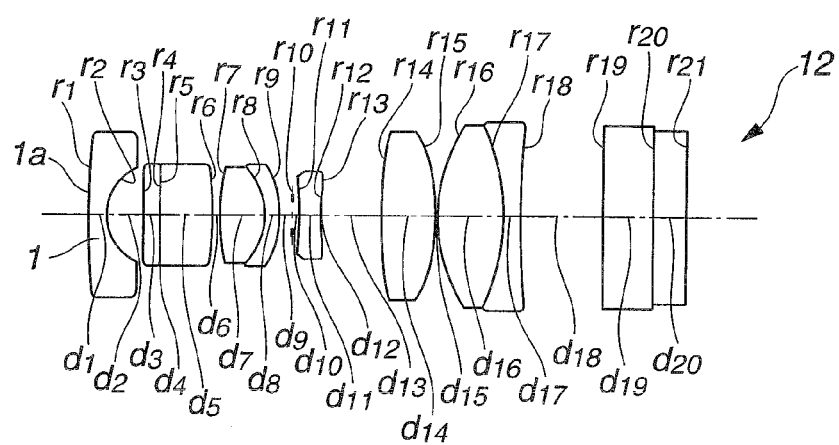
FIGS. 4A and 4B are diagrams showing the configuration of an optical system portion in a set state at a wide-angle end and in a set state at a narrow-angle end at the time of magnifying observation, respectively, in an endoscope objective optical system in Embodiment 2 of the present invention.
Figure 4B:
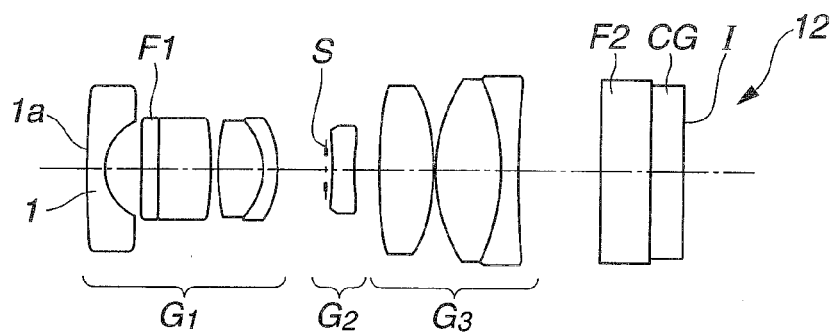

The objective optical system 12 in Embodiment 2 of the endoscope objective optical system of the present invention has a configuration shown in FIGS. 4A and 4B. In the present embodiment, the aperture diagram S is mounted in the frame 102 provided as a movable frame holding the second lens group G2 shown in FIG. 1 and enabling moving of the second lens group G2.

In the present embodiment, therefore, the aperture diagram S is moved along the optical axis direction together with the second lens group G2. In the second and other subsequent embodiments, the configuration of portions of the objective optical system 12 is shown, with the structures of the frame 101 and other portions shown in FIG. 1 omitted.

Optical characteristics in the present embodiment 2 are set as shown by numeric value data below.

| | | | |
|---|---|---|---|
| (Object surface) | d0 = D0 | | |
| r1 = 16.055 | d1 = 0.4 | n1 = 1.88815 | ν1 = 40.76 |
| r2 = 1.131 | d2 = 0.73 | | |
| r3 = ∞ | d3 = 0.31 | n2 = 1.515 | ν2 = 75 |
| r4 = ∞ | d4 = 0.03 | | |
| r5 = ∞ | d5 = 1.02 | n3 = 1.85504 | ν3 = 23.78 |
| r6 = −7.801 | d6 = 0.13 | | |
| r7 = 5.52 | d7 = 0.9 | n4 = 1.73234 | ν4 = 54.68 |
| r8 = −1.425 | d8 = 0.3 | n5 = 1.85504 | ν5 = 23.78 |
| r9 = −2.297 | d9 = D1 | | |
| r10 = ∞ (Stop) | d10 = 0.13 | | |
| r11 = −6.902 | d11 = 0.45 | n6 = 1.73234 | ν6 = 54.68 |
| r12 = 4.643 | d12 = D2 | | |
| r13 = 9.065 | d13 = 1.1 | n7 = 1.48915 | ν7 = 70.23 |
| r14 = −4.067 | d14 = 0.06 | | |
| r15 = 3.637 | d15 = 1.28 | n8 = 1.73234 | ν8 = 54.68 |
| r16 = −5.02 | d16 = 0.35 | n9 = 1.93429 | ν9 = 18.9 |
| r17 = 22.3 | d17 = 1.62 | | |
| r18 = ∞ | d18 = 1 | n10 = 1.51825 | ν10 = 64.14 |
| r19 = ∞ | d19 = 0.65 | n11 = 1.50801 | ν11 = 60 |
| r20 = ∞ | d20 = 0 | | |
| r21 = ∞ | | | |

| | Wide-angle end | Narrow-angle end |
|---|---|---|
| D0 = | 18.5 | 4.87 |
| D1 = | 0.245 | 0.93 |
| D2 = | 1.175 | 0.49 |
| Fno. = | 7.753 | 8.092 |

$f_w = 1.691$
$f_T = 1.878$
Field of view = 117.3
$|f_{O1}/f_w| = 0.82$
$r_{O1}/f_w = 9.49$
$|\theta t/\theta w| = 1.92$
$f_3/f_w = 1.93$ The objective optical system 12 in Embodiment 2 is constituted of the lens groups successively disposed from the object side: the first lens group G1 (r1 to r9) having a positive refractive power; the second lens group G2 (r10, r11) having a negative refractive power; and the third lens group G3 (r13 to r17) having a positive refractive power, as shown in FIGS. 4A and 4B and by the numeric value data shown above. Magnification change is performed by moving the second lens group G2. The aperture stop S (r10) is disposed on the object side of the second lens group G2 and is moved together with the second lens group G2 at the time of magnification change.

In the present embodiment 2, as shown in FIGS. 4A and 4B, the first lens group G1 is formed of a negative meniscus lens (r1, r2), a plane-parallel plate F1 (r3, r4), a flat-convex lens (r5, r6) and a positive cemented lens (r7 to r9) formed by cementing a biconvex lens and a negative meniscus lens.

The second lens group G2 is formed of a biconcave lens (r11, r12), and the third lens group G3 is formed of a biconvex lens (r13, r14) and a positive cemented lens (r15 to r17) formed by cementing a biconvex lens and a negative lens. On the image pickup surface I of the image pickup device, the cover glass CG for protecting the image pickup surface I and the plane-parallel plate F2 cemented to the cover glass CG are disposed.

Also in the present embodiment 2, the surface at the object-side outermost position in the first lens group G1 is formed of a convex surface, so that the focal length of the first lens group G1 can be reduced while the same field of view is maintained, and the desired depth of field can be secured. The field of view is larger than 100°, as shown in the numeric value data.

When the second lens group G2 is moved from set state at the wide-angle end to the set state at the narrow-angle end, the entire length of the objective optical system 12 in the optical axis direction is not changed.

Effects attained by satisfying the condition expression (1) shown above are as follows: the workability of the first lens 1 at the object-side outermost position can be improved; a manufacturing error in the first lens 1 can be limited; and the outside diameter of the first lens 1 can be reduced.

An effect attained by satisfying the condition expression (2) shown above is as follows: the objective optical system can have a good water removal effect while securing a sufficient depth of field. Further, with the arrangement enabling the aperture stop S to be moved together with the second lens group G2 at the time of magnification change, the outside diameter of the second lens group G2 can be reduced and the weight of the second lens group G2 can be reduced.

In the present embodiment 2, the amount of change in the F-number between the set state at the wide-angle end and the set state at the narrow-angle end can be reduced, and the depth of focus required in each set state can be secured by selecting a suitable value of the F-number by considering the diffraction limit in the set state.

Also, in the present embodiment 2, effects attained by satisfying the condition expressions (3) and (4) shown above are as follows: variation in quantity of peripheral light between the set state at the wide-angle end and the set state at the narrow-angle end can be reduced and the lens diameter of the third lens group G3 can be reduced.

Figure 5A:
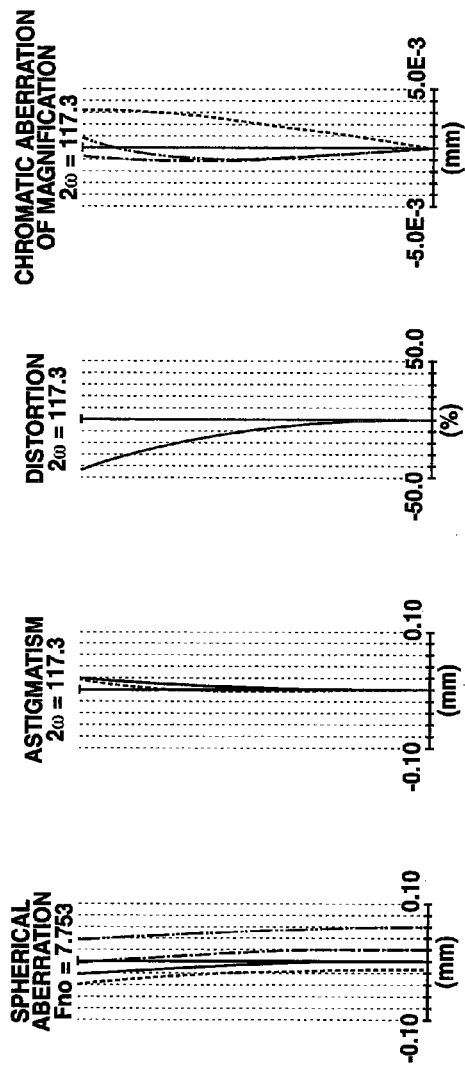
FIGS. 5A and 5B are diagrams showing spherical aberrations, astigmatisms, distortions and chromatic aberrations of magnification in the set state at the wide-angle end and in the set state at the narrow-angle end at the time of magnifying observation, respectively, in Embodiment 2 of the present invention.
Figure 5B:
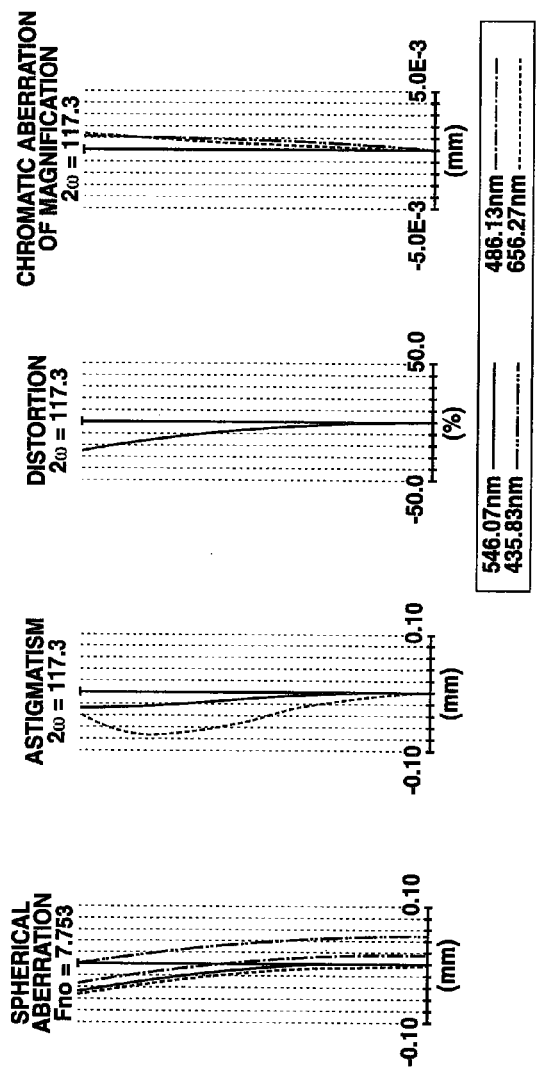

FIGS. 5A and 5B show aberrations in the set state at the wide-angle end and in the set state at the narrow-angle end, respectively, of the optical system in Embodiment 2. As is apparent from FIGS. 5A and 5B, the aberrations are well corrected in either of the two states of the objective optical system 12 in Embodiment 2.

Embodiment 3

The objective optical system 12 in Embodiment 3 of the endoscope objective optical system of the present invention has a configuration shown in FIGS. 6A and 6B, and the optical characteristics thereof are set as shown by numeric value data below.

| (Object surface) | d0 = D0 | | |
|---|---|---|---|
| r1 = 18.212 | d1 = 0.4 | n1 = 1.88814 | v1 = 40.76 |
| r2 = 0.983 | d2 = 0.9 | | |
| r3 = ∞ | d3 = 0.31 | n2 = 1.51564 | v2 = 75 |
| r4 = ∞ | d4 = 0.17 | | |
| r5 = −5.699 | d5 = 0.67 | n3 = 1.85504 | v3 = 23.78 |
| r6 = −3.15 | d6 = 0.12 | | |
| r7 = 3.486 | d7 = 0.8 | n4 = 1.72341 | v4 = 50.23 |
| r8 = −1.566 | d8 = 0.25 | n5 = 1.81264 | v5 = 25.42 |
| r9 = −2.646 | d9 = D1 | | |
| r10 = ∞ (Stop) | d10 = 0.05 | | |
| r11 = ∞ | d11 = 0.24 | n6 = 1.73234 | v6 = 54.68 |
| r12 = 6.907 | d12 = 0.26 | n7 = 1.85504 | v7 = 23.78 |
| r13 = 2.548 | d13 = D2 | | |
| r14 = 5.209 | d14 = 0.8 | n8 = 1.48915 | v7 = 70.23 |
| r15 = −79.11 | d15 = 0.1 | | |
| r16 = 3.015 | d16 = 1.55 | n9 = 1.51825 | v9 = 64.14 |
| r17 = −2.351 | d17 = 0.39 | n10 = 1.93429 | v10 = 18.9 |
| r18 = −4.181 | d18 = 1.28 | | |
| r19 = ∞ | d19 = 1 | n11 = 1.51825 | v11 = 64.14 |
| r20 = ∞ | d20 = 0.6 | n12 = 1.50801 | v11 = 60 |
| r21 = ∞ | | | |

-continued

| | Wide-angle end | Narrow-angle end |
|---|---|---|
| D0 = | 16 | 3.8 |
| D1 = | 0.3 | 0.68 |
| D2 = | 1.15 | 0.77 |
| Fno. = | 7.384 | 7.388 |

Figure 6A:
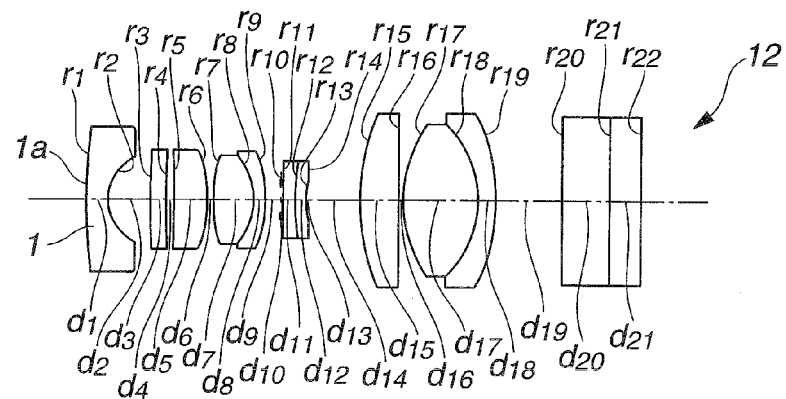
FIGS. 6A and 6B are diagrams showing the configuration of an optical system portion in a set state at a wide-angle end and in a set state at a narrow-angle end at the time of magnifying observation, respectively, in an endoscope objective optical system in Embodiment 3 of the present invention.
Figure 6B:
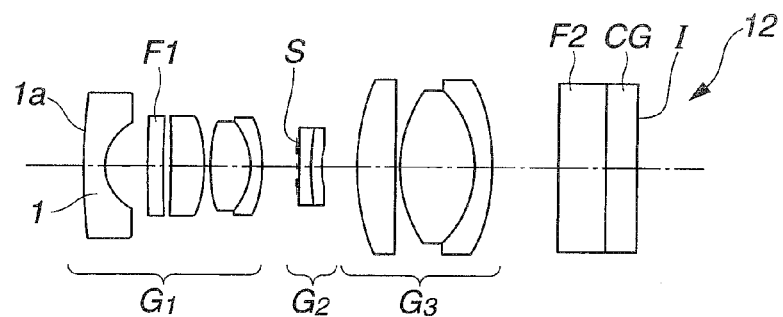

$f_W = 1.646$
$f_T = 1.724$
Field of view = 129.5
$|f_{01}/f_W| = 0.72$
$r_{01}/f_W = 11.07$
$|\theta t/\theta w| = 1.89$
$f_3/f_W = 2.12$ The objective optical system 12 in Embodiment 3 is constituted of the lens groups successively disposed from the object side: the first lens group G1 (r1 to r9) having a positive refractive power; the second lens group G2 (r11 to r13) having a negative refractive power; and the third lens group G3 (r14 to r18) having a positive refractive power, as shown in FIGS. 6A and 6B and by the numeric value data shown above. Magnification change is performed by moving the second lens group G2.

The aperture stop S (r10) is disposed on the object side of the second lens group G2 and is moved together with the second lens group G2 at the time of magnification change.

In the present embodiment 3, as shown in FIGS. 6A and 6B, the first lens group G1 is formed of a negative meniscus lens (r1, r2), a plane-parallel plate F1 (r3, r4), a meniscus convex lens (r5, r6) and a positive cemented lens (r7 to r9) formed by cementing a biconvex lens and a negative meniscus lens.

The second lens group G2 is formed of a negative cemented lens (r11 to r13) formed by cementing a plano-concave lens and a meniscus lens, and the third lens group G3 is formed of a flat-convex lens (r14, r15) and a positive cemented lens (r16 to r18) formed by cementing a biconvex lens and a negative meniscus lens.

On the image pickup surface I of the image pickup device, the cover glass CG for protecting the image pickup surface I and the plane-parallel plate F2 cemented to the cover glass CG are disposed.

Also in the present embodiment 3, the lens surface 1a at the object-side outermost position in the first lens group G1 is formed of a convex surface; the field of view is larger than 100°, as shown in the numeric value data; and the entire length of the objective optical system 12 is not changed between the set state at the wide-angle end and the set state at the narrow-angle end. The aperture stop S is moved together with the second lens group G2. The present embodiment 3 satisfies the condition expressions (1) to (4) shown above.

Figure 7A:
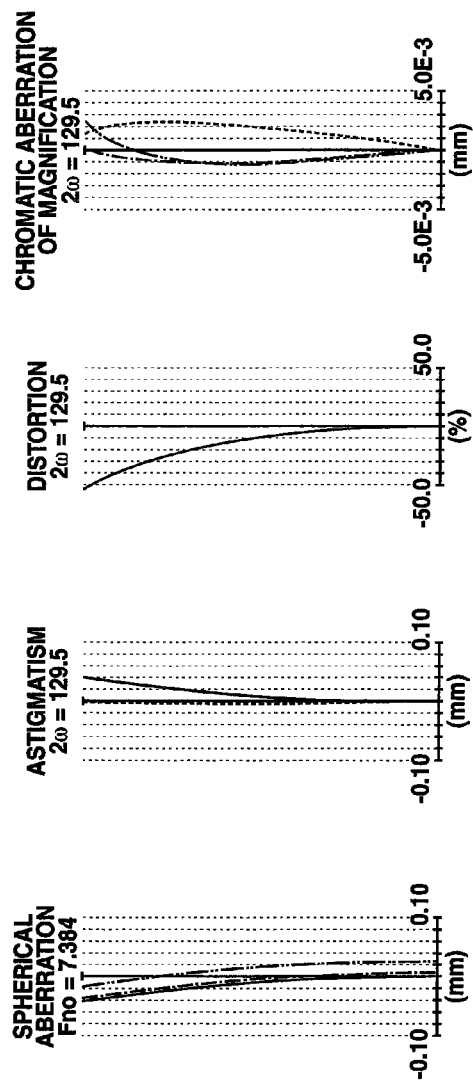
FIGS. 7A and 7B are diagrams showing spherical aberrations, astigmatisms, distortions and chromatic aberrations of magnification in the set state at the wide-angle end and in the set state at the narrow-angle end at the time of magnifying observation, respectively, in Embodiment 3 of the present invention.
Figure 7B:
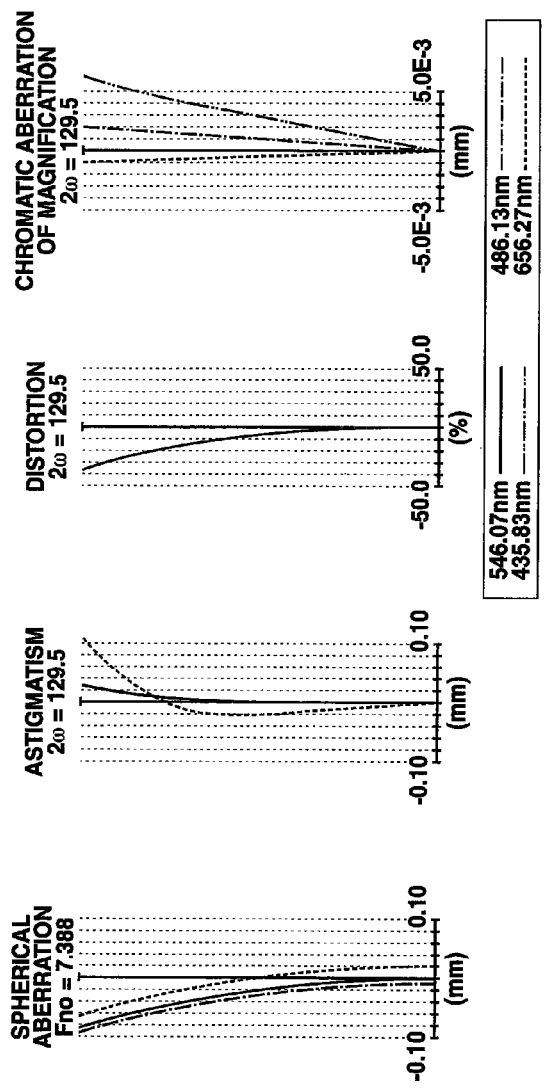

FIGS. 7A and 7B show aberrations in the set state at the wide-angle end and in the set state at the narrow-angle end, respectively, of the objective optical system 12 in Embodiment 3. As is apparent from FIGS. 7A and 7B, the aberrations are well corrected in either of the two states of the objective optical system 12 in Embodiment 3.

Embodiment 4

The objective optical system 12 in Embodiment 4 of the endoscope objective optical system of the present invention has a configuration shown in FIGS. 8A and 8B, and the optical characteristics thereof are set as shown by numeric value data below.

| (Object surface) | d0 = D0 | | |
|---|---|---|---|
| r1 = 18.798 | d1 = 0.43 | n1 = 1.88815 | v1 = 40.76 |
| r2 = 1.105 | d2 = 0.79 | | |
| r3 = ∞ | d3 = 0.31 | n2 = 1.515 | v2 = 75 |
| r4 = ∞ | d4 = 0.03 | | |
| r5 = ∞ | d5 = 0.69 | n3 = 1.85504 | v3 = 23.78 |
| r6 = −6.955 | d6 = 0.14 | | |
| r7 = 4.644 | d7 = 0.78 | n4 = 1.73234 | v4 = 54.68 |
| r8 = −1.794 | d8 = 0.29 | n5 = 1.93429 | v5 = 18.9 |
| r9 = −2.35 | d9 = D1 | | |
| r10 = ∞ (Stop) | d10 = 0.17 | | |
| r11 = −10.678 | d11 = 0.48 | n6 = 1.73234 | v6 = 54.68 |
| r12 = 3.769 | d12 = D2 | | |
| r13 = 9.167 | d13 = 1.18 | n7 = 1.48915 | v7 = 70.23 |
| r14 = −4.405 | d14 = 0.08 | | |
| r15 = 3.555 | d15 = 1.4 | n8 = 1.75844 | v8 = 52.32 |
| r16 = −4.79 | d16 = 0.35 | n9 = 1.93429 | v9 = 18.9 |
| r17 = 20.998 | d17 = 1.22 | | |
| r18 = ∞ | d18 = 1 | n10 = 1.51825 | v10 = 64.14 |
| r19 = ∞ | d19 = 0.65 | n11 = 1.52536 | v11 = 55 |
| r20 = ∞ | d20 = 0 | | |

| | Wide-angle end | Narrow-angle end |
|---|---|---|
| D0 = | 17 | 4.2 |
| D1 = | 0.2 | 0.91 |
| D2 = | 1.12 | 0.41 |
| Fno. = | 7.74 | 7.98 |

Figure 8A:
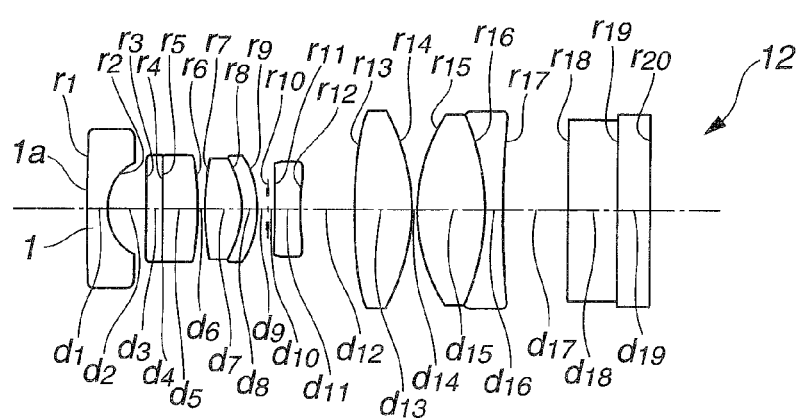
FIGS. 8A and 8B are diagrams showing the configuration of an optical system portion in a set state at a wide-angle end and in a set state at a narrow-angle end at the time of magnifying observation, respectively, in an endoscope objective optical system in Embodiment 4 of the present invention.
Figure 8B:
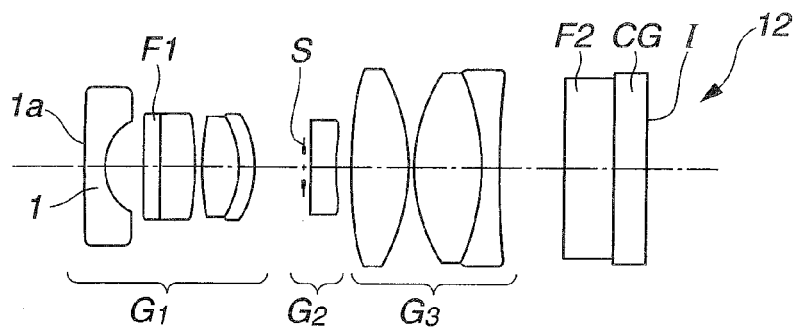

$f_w = 1.698$
$f_T = 1.862$
Field of view = 117.4
$|f_{O1}/f_w| = 0.79$
$r_{O1}/f_w = 11.07$
$|\theta t/\theta w| = 2.35$
$f_3/f_w = 1.90$ The objective optical system 12 in Embodiment 4 is constituted of the lens groups successively disposed from the object side: the first lens group G1 (r1 to r9) having a positive refractive power; the second lens group G2 (r11, r12) having a negative refractive power; and the third lens group G3 (r13 to r17) having a positive refractive power, as shown in FIGS. 8A and 8B and by the numeric value data shown above. Magnification change is performed by moving the second lens group G2.

The aperture stop S (r10) is disposed on the object side of the second lens group G2 and is moved together with the second lens group G2 at the time of magnification change.

In the present embodiment 4, as shown in FIGS. 8A and 8B, the first lens group G1 is formed of a negative meniscus lens (r1, r2), a plane-parallel plate F1 (r3, r4), a flat-convex lens (r5, r6) and a positive cemented lens (r7 to r9) formed by cementing a biconvex lens and a negative meniscus lens.

The second lens group G2 is formed of a biconcave lens (r11, r12), and the third lens group G3 is formed of a biconvex lens (r13, r14) and a positive cemented lens (r15 to r17) formed by cementing a biconvex lens and a negative meniscus lens. On the image pickup surface I of the image pickup device, the cover glass CG for protecting the image pickup surface I and the plane-parallel plate F2 cemented to the cover glass CG are disposed.

Also in the present embodiment 4, the lens surface 1a at the object-side outermost position in the first lens group G1 is formed of a convex surface; the field of view is larger than 100°; and the entire length of the objective optical system 12 is not changed when magnification change from the wide-angle end to the narrow-angle end is performed. The aperture stop S is moved together with the second lens group G2. The present embodiment 4 satisfies the condition expressions (1) to (4) shown above.

FIGS. 9A and 9B show aberrations in the set state at the wide-angle end and in the set state at the narrow-angle end, respectively, of the objective optical system 12 in Embodiment 4. As is apparent from FIGS. 9A and 9B, the aberrations are well corrected in either of the two states of the objective optical system 12 in Embodiment 4.

Embodiment 5

The objective optical system 12 in Embodiment 5 of the endoscope objective optical system of the present invention has a configuration shown in FIGS. 10A and 10B, and the optical characteristics thereof are set as shown by numeric value data below.

| (Object surface) | d0 = D0 | | |
|---|---|---|---|
| r1 = 17.116 | d1 = 0.4 | n1 = 1.88815 | v1 = 40.76 |
| r2 = 1.131 | d2 = 0.98 | | |
| r3 = ∞ | d3 = 1 | n2 = 1.85504 | v2 = 23.78 |
| r4 = −7.081 | d4 = 0.09 | | |
| r5 = 5.373 | d5 = 0.86 | n3 = 1.73234 | v3 = 54.68 |
| r6 = −1.485 | d6 = 0.3 | n4 = 1.85504 | v4 = 23.78 |
| r7 = −2.339 | d7 = D1 | | |
| r8 = ∞ (Stop) | d8 = 0.13 | | |
| r9 = −6.526 | d9 = 0.44 | n5 = 1.73234 | v5 = 54.68 |
| r10 = 4.502 | d10 = D2 | | |
| r11 = 8.596 | d11 = 1.1 | n6 = 1.48915 | v6 = 70.23 |
| r12 = −4.021 | d12 = 0.07 | | |
| r13 = 3.602 | d13 = 1.58 | n7 = 1.73234 | v7 = 54.68 |
| r14 = −4.451 | d14 = 0.35 | n8 = 1.93429 | v8 = 18.9 |
| r15 = 22.014 | d15 = 1.35 | | |
| r16 = ∞ | d16 = 1 | n9 = 1.51825 | v9 = 64.14 |
| r17 = ∞ | d17 = 0.65 | n10 = 1.52436 | v10 = 55 |
| r18 = ∞ | | | |

| | Wide-angle end | Narrow-angle end |
|---|---|---|
| D0 = | 18.5 | 4.85 |
| D1 = | 0.245 | 0.955 |
| D2 = | 1.115 | 0.405 |
| Fno. = | 7.648 | 7.981 |

Figure 10A:
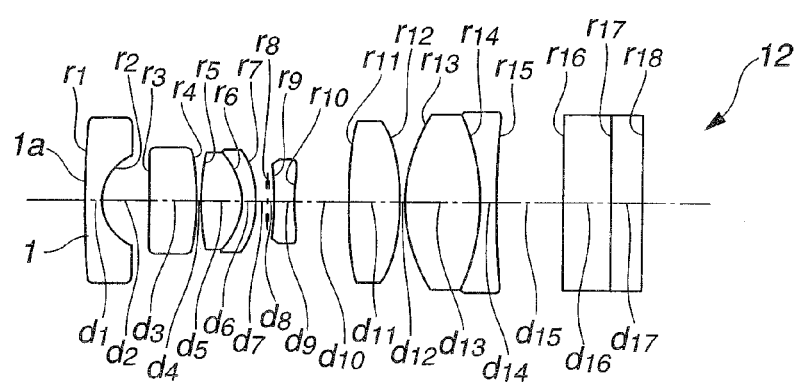
FIGS. 10A and 10B are diagrams showing the configuration of an optical system portion in a set state at a wide-angle end and in a set state at a narrow-angle end at the time of magnifying observation, respectively, in an endoscope objective optical system in Embodiment 5 of the present invention.
Figure 10B:
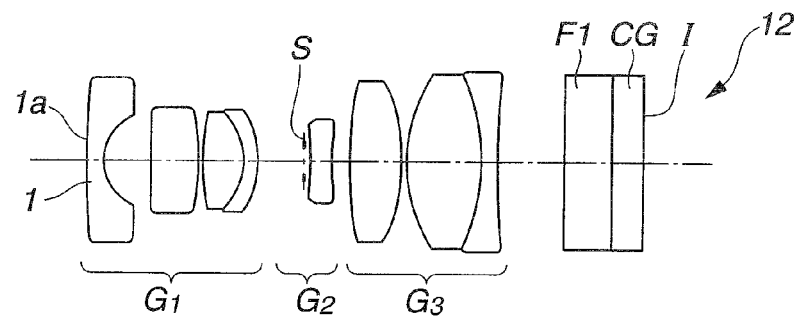

$f_w = 1.694$
$f_T = 1.885$
Field of view = 117.0
$|f_{O1}/f_w| = 0.81$
$r_{O1}/f_w = 10.10$
$|\theta t/\theta w| = 1.90$
$f_3/f_w = 1.88$ The objective optical system 12 in Embodiment 5 is constituted of the lens groups successively disposed from the object side: the first lens group G1 (r1 to r7) having a positive refractive power; the second lens group G2 (r9, r10) having a negative refractive power; and the third lens group G3 (r11 to r15) having a positive refractive power, as shown in FIGS. 10A and 10B and by the numeric value data shown above. Magnification change is performed by moving the second lens group G2.

The aperture stop S (r8) is disposed on the object side of the second lens group G2 and is moved together with the second lens group G2 at the time of magnification change.

In the present embodiment 5, as shown in FIGS. 10A and 10B, the first lens group G1 is formed of a negative meniscus lens (r1, r2), a flat-convex lens (r3, r4) and a positive cemented lens (r5 to r7) formed by cementing a biconvex lens and a negative meniscus lens.

The second lens group G2 is formed of a biconcave lens (r9, r10), and the third lens group G3 is formed of a biconvex lens (r11, r12) and a positive cemented lens (r13 to r15) formed by cementing a biconvex lens and a biconcave lens.

On the image pickup surface I of the image pickup device, the cover glass CG for protecting the image pickup surface I and the plane-parallel plate F1 cemented to the cover glass CG are disposed.

Also in the present embodiment 5, the lens surface 1a at the object-side outermost position in the first lens group G1 is formed of a convex surface; the field of view is larger than 100°; and the entire length of the objective optical system 12 is not changed when magnification change from the wide-angle end to the narrow-angle end is performed. The aperture stop S is moved together with the second lens group G2. The present embodiment 5 satisfies the condition expressions (1) to (4) shown above.

Figure 11A:
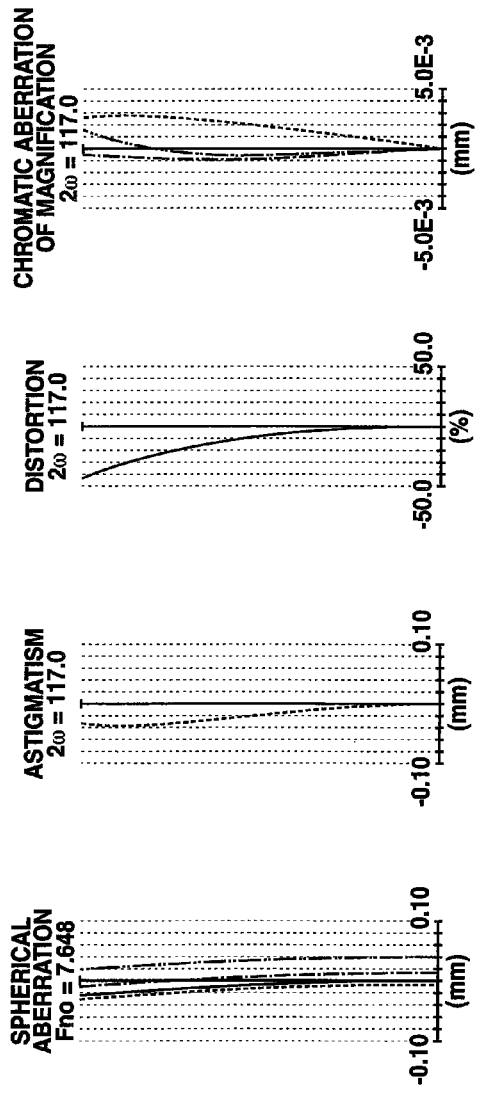
FIGS. 11A and 11B are diagrams showing spherical aberrations, astigmatisms, distortions and chromatic aberrations of magnification in the set state at the wide-angle end and in the set state at the narrow-angle end at the time of magnifying observation, respectively, in Embodiment 5 of the present invention.
Figure 11B:
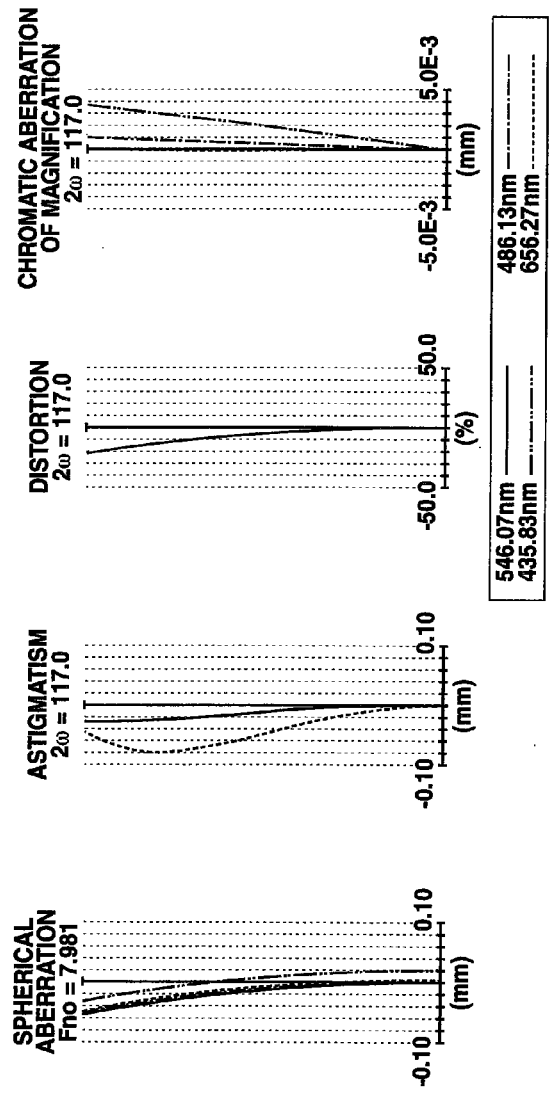

FIGS. 11A and 11B show aberrations in the set state at the wide-angle end and in the set state at the narrow-angle end, respectively, of the objective optical system 12 in Embodiment 5. As is apparent from FIGS. 11A and 11B, the aberrations are well corrected in either of the two states of the objective optical system 12 in Embodiment 5.

Embodiment 6

The objective optical system 12 in Embodiment 6 of the endoscope objective optical system of the present invention has a configuration shown in FIGS. 12A and 12B, and the optical characteristics thereof are set as shown by numeric value data below. An aspherical lens shape used in the present embodiment 6 is defined by the following equation (5):

$$x = (y^2/r)/[1+\{1-(k+1)(y/r)^2\}^{1/2}] + \Sigma AC_{2i} \times y^{2i} \quad (5)$$

The above equation (5) is formed with respect to a coordinate system in which the x-axis corresponds to the optical axis direction and the y-axis corresponds to a direction perpendicular the optical axis. In the above equation, r is the radius of curvature on the optical axis, k is a cone coefficient, and ACk is an aspherical surface coefficient. k and $AC_{2i}$ in the present embodiment 6 and other subsequent embodiments are as shown in data.

| (Object surface) | d0 = D0 | | |
|---|---|---|---|
| r1 = (Aspherical surface) | d1 = 0.4 | n1 = 1.88814 | v1 = 40.78 |
| r2 = 0.851 | d2 = 0.98 | | |
| r3 = −29.857 | d3 = 0.51 | n2 = 1.85504 | v2 = 23.78 |
| r4 = −7.551 | d4 = 0.1 | | |
| r5 = 2.999 | d5 = 0.21 | n3 = 1.88815 | v3 = 40.76 |
| r6 = 1.284 | d6 = 0.56 | n4 = 1.77621 | v4 = 49.6 |
| r7 = −1.909 | d7 = D1 | | |
| r8 = ∞ (Stop) | d8 = 0.05 | | |
| r9 = −10.118 | d9 = 0.25 | n5 = 1.59143 | v5 = 61.14 |
| r10 = 2.336 | d10 = D2 | | |
| r11 = 5.709 | d11 = 1.34 | n6 = 1.75844 | v6 = 52.32 |
| r12 = −2.2 | d12 = 0.3 | n7 = 1.93429 | v7 = 18.9 |
| r13 = −6.094 | d13 = 0.04 | | |
| r14 = 8.972 | d14 = 0.68 | n8 = 1.73234 | v8 = 54.68 |
| r15 = −9.043 | d15 = 1.21 | | |
| r16 = ∞ | d16 = 1 | n9 = 1.51825 | v9 = 64.14 |
| r17 = ∞ | d17 = 0.6 | n10 = 1.50801 | v10 = 60 |
| r18 = ∞ | | | |

(First surface)

| rdy = 8.09 | k = −0.0217 | AC4 = −1.244 × 10⁻³ | AC6 = 9.563 × 10⁻⁴ |

| | Wide-angle end | Narrow-angle end |
|---|---|---|
| D0 = | 16 | 3.55 |
| D1 = | 0.23 | 0.63 |
| D2 = | 1.26 | 0.86 |
| Fno. = | 7.221 | 7.226 |

-continued $f_w$ = 1.464
$f_T$ = 1.573
Field of view = 134.6
$|f_{O1}/f_w|$ = 0.75
$r_{O1}/f_w$ = 5.52
$|\theta t/\theta w|$ = 2.61
$f3/f_w$ = 2.06

Figure 12A:
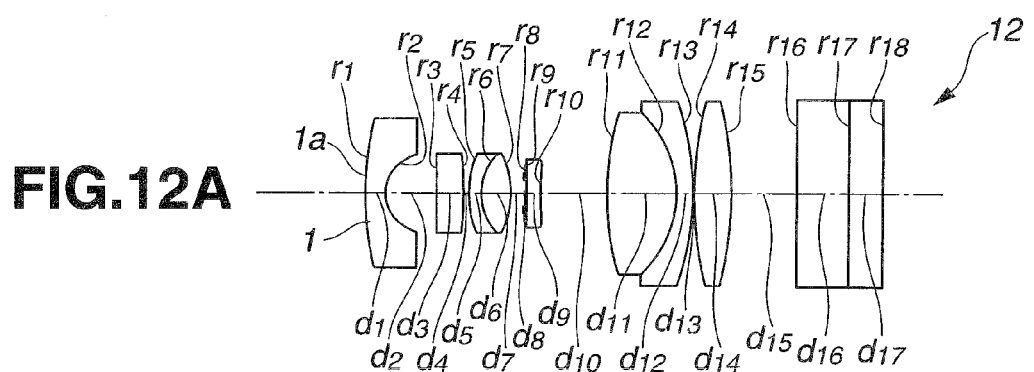
FIGS. 12A and 12B are diagrams showing the configuration of an optical system portion in a set state at a wide-angle end and in a set state at a narrow-angle end at the time of magnifying observation, respectively, in an endoscope objective optical system in Embodiment 6 of the present invention.
Figure 12B:
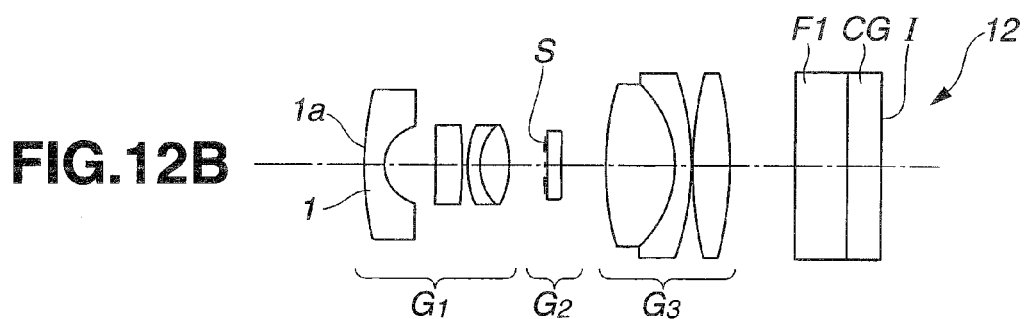

The objective optical system in Embodiment 6 is constituted of the lens groups successively disposed from the object side: the first lens group G1 (r1 to r7) having a positive refractive power; the second lens group G2 (r9, r10) having a negative refractive power; and the third lens group G3 (r11 to r15) having a positive refractive power, as shown in FIGS. 12A and 12B and by the numeric value data shown above. Magnification change is performed by moving the second lens group G2. The aperture stop S (r8) is disposed on the object side of the second lens group G2 and is moved together with the second lens group G2 at the time of magnification change.

In the present embodiment 6, as shown in FIGS. 12A and 12B, the first lens group G1 is formed of a negative meniscus lens (r1, r2) having an aspherical surface on the object side, a meniscus convex lens (r3, r4) and a positive cemented lens (r5 to r7) formed by cementing a negative meniscus lens and a biconvex lens.

The second lens group G2 is formed of a biconcave lens (r9, r10), and the third lens group G3 is formed of a positive cemented lens (r11 to r13) formed by cementing a biconvex lens and a negative meniscus lens, and a biconvex lens (r14, r15). On the image pickup surface I of the image pickup device, the cover glass CG for protecting the image pickup surface I and the plane-parallel plate F1 cemented to the cover glass CG are disposed.

Also in the present embodiment 6, the surface at the object-side outermost position in the first lens group G1 is formed of a convex surface; the field of view is larger than 100°; the entire length of the objective optical system 12 is not changed between the set state at the wide-angle end and the set state at the narrow-angle end; and the condition expressions (1) to (4) shown above are satisfied.

The aperture stop S is moved together with the second lens group G2. Further, the lens surface 1a at the object-side outermost position in the first lens group G1 is formed of an aspherical surface. Therefore, aberrations respectively occurring in the set state at the wide-angle and in the set state and the narrow-angle end at the time of observation with the movement of the aperture stop S accompanying magnification change can be corrected by the first lens 1 having the aspherical surface.

Figure 13A:
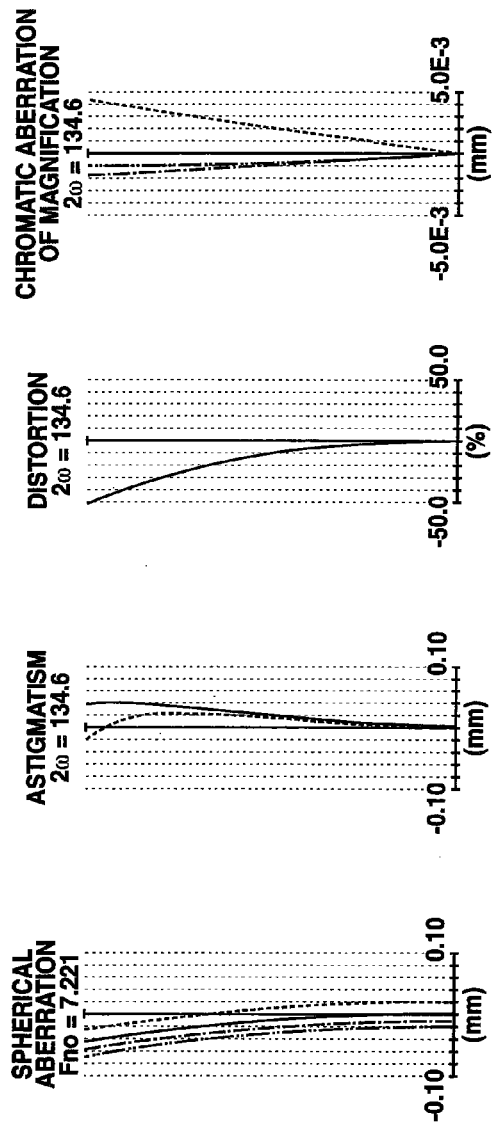
FIGS. 13A and 13B are diagrams showing spherical aberrations, astigmatisms, distortions and chromatic aberrations of magnification in the set state at the wide-angle end and in the set state at the narrow-angle end at the time of magnifying observation, respectively, in Embodiment 6 of the present invention.
Figure 13B:
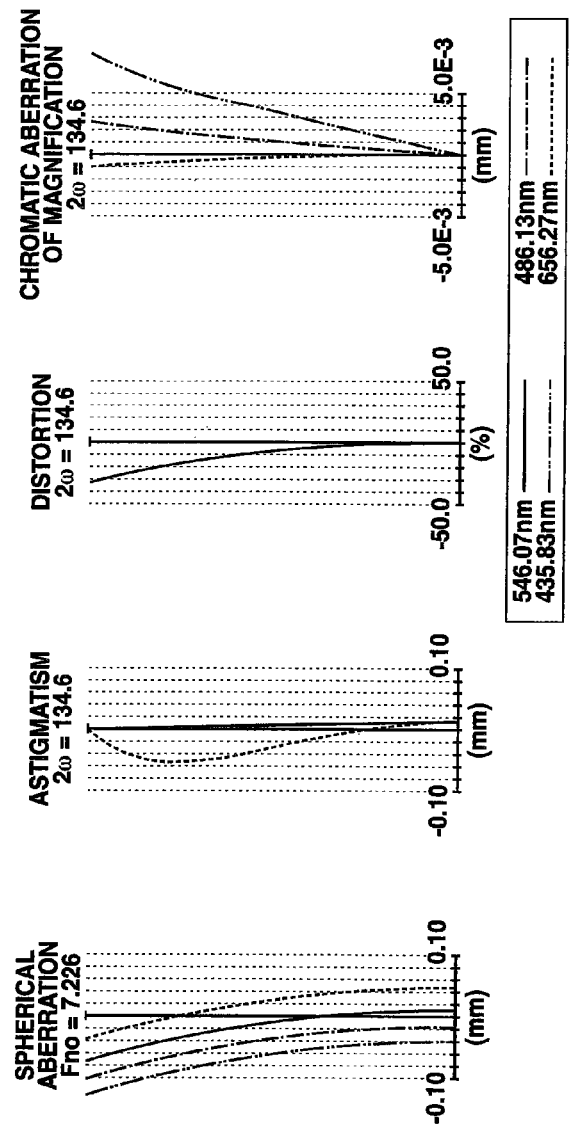

FIGS. 13A and 13B show aberrations in the set state at the wide-angle end and in the set state at the narrow-angle end, respectively, of the objective optical system 12 in Embodiment 6. As is apparent from FIGS. 13A and 13B, the aberrations are well corrected in either of the two states of the objective optical system 12 in Embodiment 6.

Embodiment 7

The objective optical system 12 in Embodiment 7 of the endoscope objective optical system of the present invention has a configuration shown in FIGS. 14A and 14B, and the optical characteristics thereof are set as shown by numeric value data below.

| (Object surface) | d0 = D0 | | |
|---|---|---|---|
| r1 = (Aspherical surface) | d1 = 0.4 | n1 = 1.88814 | ν1 = 40.78 |
| r2 = 0.852 | d2 = 0.98 | | |
| r3 = −29.701 | d3 = 0.51 | n2 = 1.85504 | ν2 = 23.78 |
| r4 = −7.524 | d4 = 0.1 | | |
| r5 = 3 | d5 = 0.21 | n3 = 1.88815 | ν3 = 40.76 |
| r6 = 1.283 | d6 = 0.55 | n4 = 1.77621 | ν4 = 49.6 |
| r7 = −1.91 | d7 = D1 | | |
| r8 = ∞ (Stop) | d8 = 0.05 | | |
| r9 = −10.09 | d9 = 0.25 | n5 = 1.59143 | ν5 = 61.14 |
| r10 = 2.336 | d10 = D2 | | |
| r11 = 5.699 | d11 = 1.34 | n6 = 1.75844 | ν6 = 52.32 |
| r12 = −2.2 | d12 = 0.3 | n7 = 1.93429 | ν7 = 18.9 |
| r13 = −6.099 | d13 = 0.04 | | |
| r14 = 8.991 | d14 = 0.69 | n8 = 1.73234 | ν8 = 54.68 |
| r15 = −9.039 | d15 = 1.24 | | |
| r16 = ∞ | d16 = 1 | n9 = 1.51825 | ν9 = 64.14 |
| r17 = ∞ | d17 = 0.6 | n10 = 1.50801 | ν10 = 60 |
| r18 = ∞ | | | |

(First surface)

rdy = 8.066    k = −0.066    AC4 = −1.511 × 10$^{-3}$    AC6 = 9.317 × 10$^{-4}$

| | Wide-angle end | Narrow-angle end |
|---|---|---|
| D0 = | 16 | 3.8 |
| D1 = | 0.23 | 0.63 |
| D2 = | 1.26 | 0.86 |
| Fno. = | 7.225 | 7.203 |

Figure 14A:
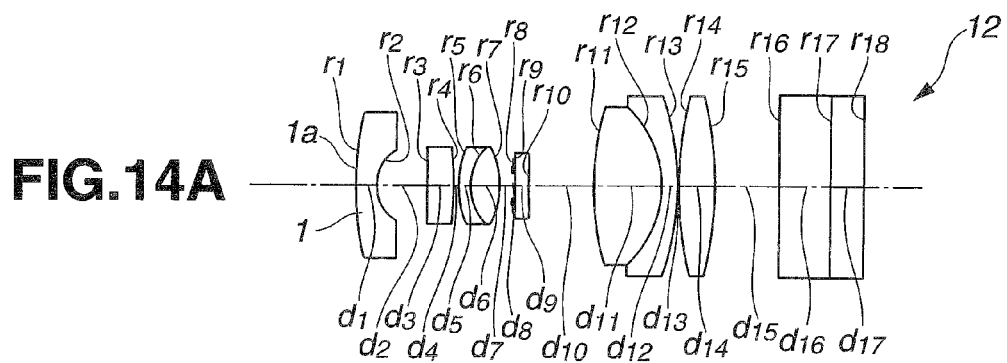
FIGS. 14A and 14B are diagrams showing the configuration of an optical system portion in a set state at a wide-angle end and in a set state at a narrow-angle end at the time of magnifying observation, respectively, in an endoscope objective optical system in Embodiment 7 of the present invention.
Figure 14B:
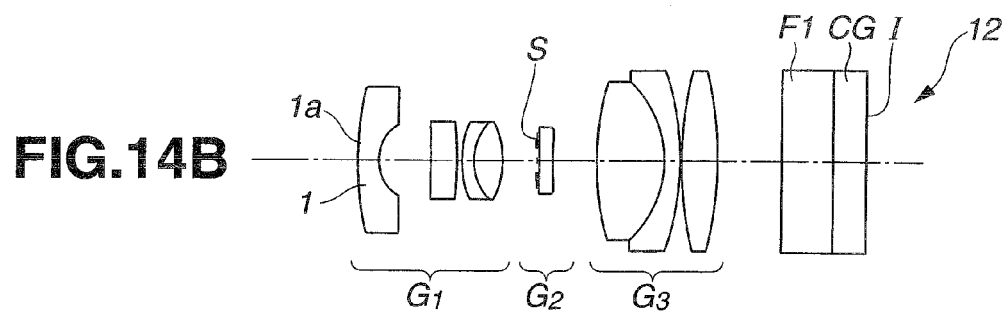

$f_w = 1.468$
$f_T = 1.577$
Field of view = 134.2
$|f_{O1}/f_w| = 0.75$
$r_{O1}/f_w = 5.49$
$|\theta t/\theta w| = 2.59$
$f_3/f_w = 2.05$ The objective optical system 12 in Embodiment 7 is constituted of the lens groups successively disposed from the object side: the first lens group G1 (r1 to r7) having a positive refractive power; the second lens group G2 (r9, r10) having a negative refractive power; and the third lens group G3 (r11 to r15) having a positive refractive power, as shown in FIGS. 14A and 14B and by the numeric value data shown above. Magnification change is performed by moving the second lens group G2. The aperture stop S (r8) is disposed on the object side of the second lens group G2 and is moved together with the second lens group G2 at the time of magnification change.

In the present embodiment, as shown in FIGS. 14A and 14B, the first lens group G1 is formed of a negative meniscus lens (r1, r2) having an aspherical surface on the object side, a positive meniscus lens (r3, r4) and a positive cemented lens (r5 to r7) formed by cementing a negative meniscus lens and a biconvex lens.

The second lens group G2 is formed of a biconcave lens (r9, r10), and the third lens group G3 is formed of a positive cemented lens (r11 to r13) formed by cementing a biconvex lens and a negative meniscus lens, and a biconvex lens (r14, r15). On the image pickup surface I of the image pickup device, the cover glass CG for protecting the image pickup surface I and the plane-parallel plate F1 cemented to the cover glass CG are disposed.

In the present embodiment 7, the lens surface 1a at the object-side outermost position in the first lens group G1 is formed of a convex surface; the field of view is larger than 100°; the entire length of the objective optical system 12 is not changed when magnification change from the wide-angle end to the narrow-angle end is performed; and the condition expressions (1) to (4) shown above are satisfied. The aperture stop S is moved together with the second lens group G2. Further, the lens surface 1a at the object-side outermost position in the first lens group is formed of an aspherical surface. Therefore, aberrations respectively occurring in a peripheral portion even in a wide-angle state can be corrected by the aspherical surface.

Figure 15A:
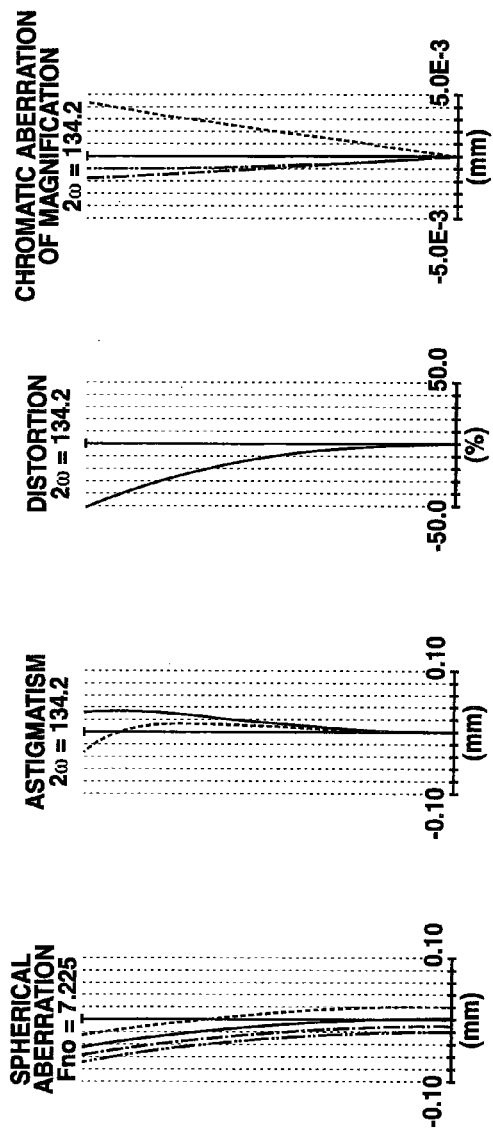
FIGS. 15A and 15B are diagrams showing spherical aberrations, astigmatisms, distortions and chromatic aberrations of magnification in the set state at the wide-angle end and in the set state at the narrow-angle end at the time of magnifying observation, respectively, in Embodiment 7 of the present invention.
Figure 15B:
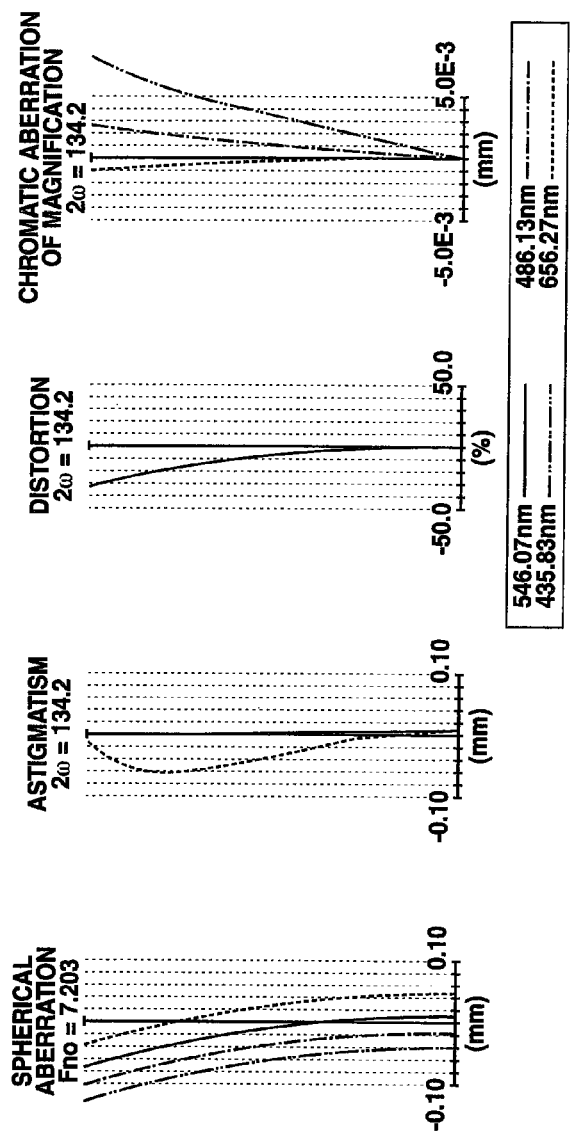

FIGS. 15A and 15B show aberrations in the set state at the wide-angle end and in the set state at the narrow-angle end, respectively, of the objective optical system 12 in Embodiment 7. As is apparent from FIGS. 15A and 15B, the aberrations are well corrected in either of the two states of the objective optical system 12 in Embodiment 7.

Embodiment 8

The objective optical system 12 in Embodiment 8 of the endoscope objective optical system of the present invention has a configuration shown in FIGS. 16A and 16B, and the optical characteristics thereof are set as shown by numeric value data below.

| (Object surface) | d0 = D0 | | |
|---|---|---|---|
| r1 = (Aspherical surface) | d1 = 0.4 | n1 = 1.88814 | ν1 = 40.78 |
| r2 = 0.859 | d2 = 0.97 | | |
| r3 = −28.151 | d3 = 0.51 | n2 = 1.85504 | ν2 = 23.78 |
| r4 = −7.42 | d4 = 0.1 | | |
| r5 = 2.997 | d5 = 0.21 | n3 = 1.88815 | ν3 = 40.76 |
| r6 = 1.279 | d6 = 0.52 | n4 = 1.77621 | ν4 = 49.6 |
| r7 = −1.914 | d7 = D1 | | |
| r8 = ∞ (Stop) | d8 = 0.05 | | |
| r9 = −9.812 | d9 = 0.25 | n5 = 1.59143 | ν5 = 61.14 |
| r10 = 2.329 | d10 = D2 | | |
| r11 = 5.62 | d11 = 1.34 | n6 = 1.75844 | ν6 = 52.32 |
| r12 = −2.2 | d12 = 0.3 | n7 = 1.93429 | ν7 = 18.9 |
| r13 = −6.098 | d13 = 0.05 | | |
| r14 = 9.076 | d14 = 0.69 | n8 = 1.73234 | ν8 = 54.68 |
| r15 = −8.935 | d15 = 1.22 | | |
| r16 = ∞ | d16 = 1 | n9 = 1.51825 | ν9 = 64.14 |
| r17 = ∞ | d17 = 0.6 | n10 = 1.50801 | ν10 = 60 |
| r18 = ∞ | | | |

(First surface)

rdy = 0.859    k = 0.002    AC4 = 6.632 × 10$^{-3}$    AC6 = 2.280 × 10$^{-2}$

| | Wide-angle end | Narrow-angle end |
|---|---|---|
| D0 = | 16 | 3.75 |
| D1 = | 0.23 | 0.62 |
| D2 = | 1.27 | 0.88 |
| Fno. = | 7.222 | 7.237 |

Figure 16A:
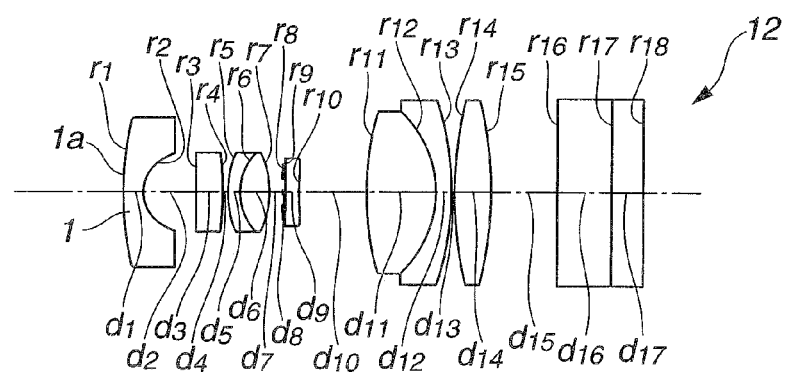
FIGS. 16A and 16B are diagrams showing the configuration of an optical system portion in a set state at a wide-angle end and in a set state at a narrow-angle end at the time of magnifying observation, respectively, in an endoscope objective optical system in Embodiment 8 of the present invention.
Figure 16B:
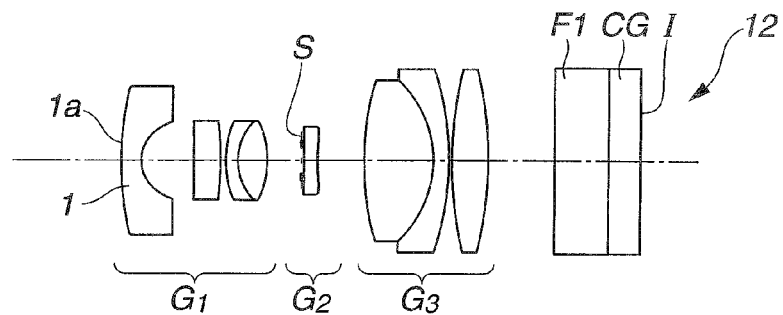

$f_w = 1.485$
$f_T = 1.596$
Field of view = 133.9
$|f_{O1}/f_w| = 0.75$
$r_{O1}/f_w = 5.37$
$|\theta t/\theta w| = 2.74$
$f_3/f_w = 2.02$ The objective optical system 12 in Embodiment 8 is constituted of the lens groups successively disposed from the object side: the first lens group G1 (r1 to r7) having a positive refractive power; the second lens group G2 (r9, r10) having a negative refractive power; and the third lens group G3 (r11 to r15) having a positive refractive power, as shown in FIGS. 16A and 16B and by the numeric value data shown above. Magnification change is performed by moving the second lens group G2. The aperture stop S (r8) is disposed on the object side of the second lens group G2 and is moved together with the second lens group G2 at the time of magnification change.

In the present embodiment, as shown in FIGS. 16A and 16B, the first lens group G1 is formed of a negative meniscus lens (r1, r2) having an aspherical surface on the object side, a positive meniscus lens (r3, r4) and a positive cemented lens (r5 to r7) formed by cementing a negative meniscus lens and a biconvex lens.

The second lens group G2 is formed of a biconcave lens (r9, r10), and the third lens group G3 is formed of a positive cemented lens (r11 to r13) formed by cementing a biconvex lens and a negative meniscus lens, and a biconvex lens (r14, r15). On the image pickup surface I of the image pickup device, the cover glass CG for protecting the image pickup surface I and the plane-parallel plate F1 cemented to the cover glass CG are disposed.

Also in the present embodiment 8, the lens surface 1*a* at the object-side outermost position in the first lens group G1 is formed of a convex surface; the field of view is larger than 100°; the entire length of the objective optical system 12 is not changed when magnification change from the wide-angle end to the narrow-angle end is performed; and the condition expressions (1) to (4) shown above are satisfied.

The aperture stop S is moved together with the second lens group G2. The lens surface on the image side of the first lens 1 at the object-side outermost position in the first lens group G1 is formed of an aspherical surface.

FIGS. 17A and 17B show aberrations in the set state at the wide-angle end and in the set state at the narrow-angle end, respectively, of the objective optical system in Embodiment 8. As is apparent from FIGS. 17A and 17B, the aberrations are well corrected in either of the two states of the objective optical system 12 in Embodiment 8.

Embodiment 9

The objective optical system 12 in Embodiment 9 of the endoscope objective optical system of the present invention has a configuration shown in FIGS. 18A and 18B, and the optical characteristics thereof are set as shown by numeric value data below.

| (Object surface) | d0 = D0 | | |
|---|---|---|---|
| r1 = 10.291 | d1 = 0.4 | n1 = 1.88814 | v1 = 40.78 |
| r2 = 0.901 | d2 = 0.96 | | |
| r3 = −15.032 | d3 = 0.51 | n2 = 1.85504 | v2 = 23.78 |
| r4 = −11.056 | d4 = 0.1 | | |
| r5 = 2.193 | d5 = 0.3 | n3 = 1.88815 | v3 = 40.76 |
| r6 = 1.315 | d6 = 0.55 | n4 = 1.77621 | v4 = 49.6 |
| r7 = (Aspherical surface) | d7 = D1 | | |
| r8 = ∞ (Stop) | d8 = 0.05 | | |
| r9 = −7.42 | d9 = 0.3 | n5 = 1.59143 | v5 = 61.14 |
| r10 = 2.084 | d10 = D2 | | |
| r11 = 5.565 | d11 = 1.49 | n6 = 1.75844 | v6 = 52.32 |
| r12 = −2.2 | d12 = 0.3 | n7 = 1.93429 | v7 = 18.9 |
| r13 = −5.475 | d13 = 0.12 | | |
| r14 = 10.537 | d14 = 0.94 | n8 = 1.73234 | v8 = 54.68 |
| r15 = −8.496 | d15 = 1.2 | | |
| r16 = ∞ | d16 = 1 | n9 = 1.51825 | v9 = 64.14 |
| r17 = ∞ | d17 = 0.6 | n10 = 1.50801 | v10 = 60 |
| r18 = ∞ | | | |

| (Seventh surface) | | | |
|---|---|---|---|
| rdy = −2.101 | k = 0.1394 | AC4 = 1.532 × 10⁻² | AC6 = −1.069 × 10⁻² |

| | Wide-angle end | Narrow-angle end |
|---|---|---|
| D0 = | 16 | 3.5 |
| D1 = | 0.23 | 0.61 |
| D2 = | 1.43 | 1.05 |
| Fno. = | 7.385 | 7.415 |

$f_w$ = 1.568
$f_T$ = 1.727
Field of view = 132.6
$|f_{01}/f_w|$ = 0.72
$r_{01}/f_w$ = 6.56
$|\theta t/\theta w|$ = 3.30
$f_3/f_w$ = 1.91

Figure 18A:
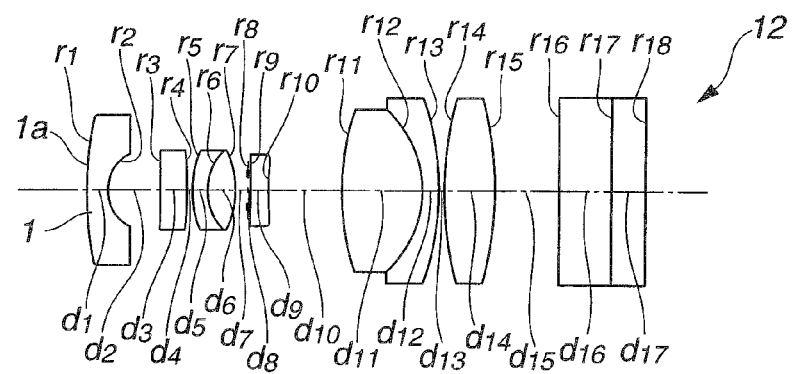
FIGS. 18A and 18B are diagrams showing the configuration of an optical system portion in a set state at a wide-angle end and in a set state at a narrow-angle end at the time of magnifying observation, respectively, in an endoscope objective optical system in Embodiment 9 of the present invention.
Figure 18B:
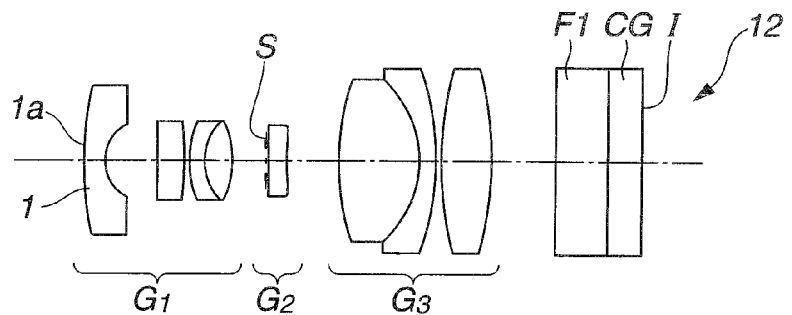

The objective optical system 12 in Embodiment 9 is constituted of the lens groups successively disposed from the object side: the first lens group G1 (r1 to r7) having a positive refractive power; the second lens group G2 (r9, r10) having a negative refractive power; and the third lens group G3 (r11 to r15) having a positive refractive power, as shown in FIGS. 18A and 18B and by the numeric value data shown above. Magnification change is performed by moving the second lens group G2. The aperture stop S (r8) is disposed on the object side of the second lens group G2 and is moved together with the second lens group G2 at the time of magnification change.

In the present embodiment, as shown in FIGS. 18A and 18B, the first lens group G1 is formed of a negative meniscus lens (r1, r2), a positive meniscus lens (r3, r4) and a positive cemented lens (r5 to r7) formed by cementing a negative meniscus lens and a biconvex lens having an aspherical surface on the image side.

The second lens group G2 is formed of a biconcave lens (r9, r10), and the third lens group G3 is formed of a positive cemented lens (r11 to r13) formed by cementing a biconvex lens and a negative meniscus lens, and a biconvex lens (r14, r15). On the image pickup surface I of the image pickup device, the cover glass CG for protecting the image pickup surface I and the plane-parallel plate F1 cemented to the cover glass CG are disposed.

Also in the present embodiment 9, the lens surface 1*a* at the object-side outermost position in the first lens group G1 is formed of a convex surface; the field of view is larger than 100°; the entire length of the objective optical system 12 is not changed when magnification change from the wide-angle end to the narrow-angle end is performed; and the condition expressions (1) to (4) shown above are satisfied.

The aperture stop S is moved together with the second lens group G2. The lens surface (of the cemented lens in this case) at the image-side outermost position in the first lens group G1 is formed of an aspherical surface. An aspherical surface may also be applied to a non-cemented lens provided in place of the cemented lens in the first lens group G1.

Therefore, aberrations respectively occurring in the set state at the wide-angle end and in the set state and the narrow-angle end at the time of magnifying observation with the movement of the aperture stop S accompanying magnification change can be corrected by the aspherical surface.

FIGS. 19A and 19B show aberrations in the set state at the wide-angle end and in the set state at the narrow-angle end, respectively, of the objective optical system 12 in Embodiment 9. As is apparent from FIGS. 19A and 19B, the aberrations are well corrected in either of the two states of the objective optical system 12 in Embodiment 9.

While the embodiments have been described with respect to a case where an optical image of an object is formed on the image pickup surface I of an image pickup device by means of the endoscope objective optical system, the present invention can be applied to image forming on an image guide formed of a multiplicity of fibers. The present invention can also be applied to image forming using a relay optical system as an image guide. Embodiments that belong to the present inven-

What is claimed is:

1. An endoscope objective optical system used in an endoscope, comprising:
   an objective optical system including a first lens group having a positive refractive power, an aperture stop, a second lens group having a negative refractive power and a third lens group having a positive refractive power, the first lens group, the aperture stop and the second and third lens group being successively disposed from the object side, wherein
   the second lens group is made movable along an optical axis to change the focal length of the objective optical system,
   the lens surface at the object-side outermost position in the first lens group is formed so as to be convex on the object side;
   the first lens group is the most object side lens group of the endoscope objective optical system; and
   wherein if the focal length of the first lens disposed at the object-side outermost position in the first lens group is $f_{01}$ and if the focal length of the objective optical system at the wide-angle end is $f_w$, the following condition expression is satisfied:

$0.5 < |f_{01}/f_w| < 1.2.$

2. The endoscope objective optical system according to claim 1, wherein when the second lens group is set at a wide-angle end at which the field of view is maximized, the field of view corresponding to the maximum image height is 100° or more.

3. The endoscope objective optical system according to claim 1, wherein when the second lens group is moved to change the focal length of the objective optical system, the distance from a first lens at the object-side outermost position to an image plane is constant.

4. The endoscope objective optical system according to claim 1, wherein
   if the radius of curvature of an objective-side surface of the first lens disposed at the object-side outermost position in the first lens group is $r_{01}$ and if the focal length of the objective optical system at the wide-angle end is $f_w$, the following condition expression is satisfied:

$5 < r_{01}/f_w < 20.$

5. The endoscope objective optical system according to claim 1, wherein the aperture stop is moved together with the second lens group.

6. The endoscope objective optical system according to claim 5, wherein at least one lens surface in the first lens group is formed into an aspherical surface.

7. The endoscope objective optical system according to claim 6, wherein at least one lens surface of the lens disposed at the image-side outermost position or a cemented lens in the first lens group is formed into an aspherical surface.

8. The endoscope objective optical system according to claim 5, wherein at least one lens surface of the lens disposed at the object-side outermost position in the first lens group is formed into an aspherical surface.

9. The endoscope objective optical system according to claim 1, wherein
   if the angle of incidence of a principal ray on the image plane when the second lens group is set at a narrow-angle end at which the field of view is minimized is $\theta_t$ and if the angle of incidence of a principal ray on the image plane when the second lens group is set at the wide-angle end is $\theta_w$, the following condition expression is satisfied:

$|\theta_t/\theta_w| < 3.5.$

10. The endoscope objective optical system according to claim 9, wherein
    if the focal length of the third lens group is $f_3$ and if the focal length of the objective optical system at the wide-angle end is $f_w$, the following condition expression is satisfied:

$1.5 < f_3/f_w < 3.5.$

11. The endoscope objective optical system according to claim 1, wherein the first lens disposed at the object-side outermost position in the first lens group is a meniscus lens convex on the object side, concave on the image side and having a negative refractive power.

12. The endoscope objective optical system according to claim 1, wherein an image pickup device is disposed on the image side of the third lens group.

13. The endoscope objective optical system according to claim 1, wherein the second lens group consists of a single lens having negative refractive power.

14. The endoscope objective optical system according to claim 1, wherein the second lens group consists of a single lens or a cemented lens formed by cementing two lenses.

* * * * *